(12) United States Patent
Suzuki et al.

(10) Patent No.: US 6,407,791 B1
(45) Date of Patent: Jun. 18, 2002

(54) MULTI-DOMAIN LIQUID CRYSTAL DISPLAY DEVICE

(75) Inventors: Teruaki Suzuki; Masayoshi Suzuki; Toshiya Ishii; Hiroshi Hayama; Hiroshi Kanoh; Naoyasu Ikeda; Ken-Ichi Takatori; Takashi Nose; Takahiko Watanabe, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/605,259

(22) Filed: Jun. 26, 2000

(30) Foreign Application Priority Data

Jun. 25, 1999 (JP) .............................. 11-180615
Dec. 17, 1999 (JP) .......................... 11-359411

(51) Int. Cl.⁷ ...................... G02F 1/1337; G02F 1/1343
(52) U.S. Cl. ...................................... 349/129; 349/143
(58) Field of Search ................................ 349/129, 143, 349/38, 123, 138

(56) References Cited

U.S. PATENT DOCUMENTS 5,608,556 A * 3/1997 Koma ......................... 349/143
6,081,315 A * 6/2000 Matsuyama et al. ........ 349/143

FOREIGN PATENT DOCUMENTS

| JP | 6-43461 | 2/1994 |
| JP | 7-199190 | 8/1995 |
| JP | 7-230097 | 8/1995 |
| JP | 10-20323 | 1/1998 |
| JP | 10-232409 | 9/1998 |
| JP | 10-301114 | 11/1998 |

* cited by examiner

Primary Examiner—William L. Sikes
Assistant Examiner—Tarifur R. Chowdhury
(74) Attorney, Agent, or Firm—Scully, Scott, Murphy & Presser

(57) ABSTRACT

A multi-domain liquid crystal display device having sharp contrast and excellent viewing angle characteristics is provided without increased complicated processes such as microfabrication for a common electrode or without the necessity for highly sophisticated laminating technology. The multi-domain liquid crystal display device is composed of a control electrode connected to a source terminal being one of terminals of a TFT (Thin Film Transistor) serving as a switching device, a picture electrode having an aperture section provided with one coupling capacitor connected between the pixel electrode and the control electrode, wherein a partial voltage of a signal voltage is applied to the pixel electrode through the other coupling capacitor.

49 Claims, 37 Drawing Sheets

*cross-sectional view taken along line A-A'*

*cross-sectional view taken along line B-B'* cross-sectional view taken along line C-C'

*cross-sectional view taken along line D-D'*

*cross-sectional view taken along line E-E'*

21 ;liquid crystal molecule

71 ;picture element electrode
74 ;aperture section
73 ;control electrode cross-sectional view taken along line A-A' cross-sectional view taken along line A-A' cross-sectional view taken along line F-F"

cross-sectional view taken along line G-G'

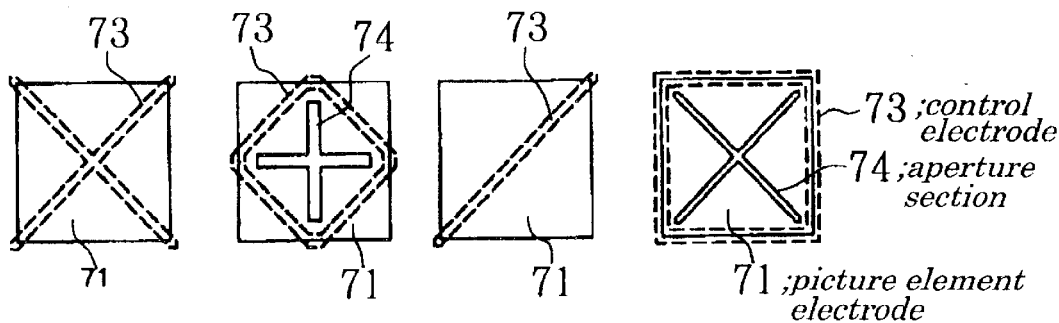
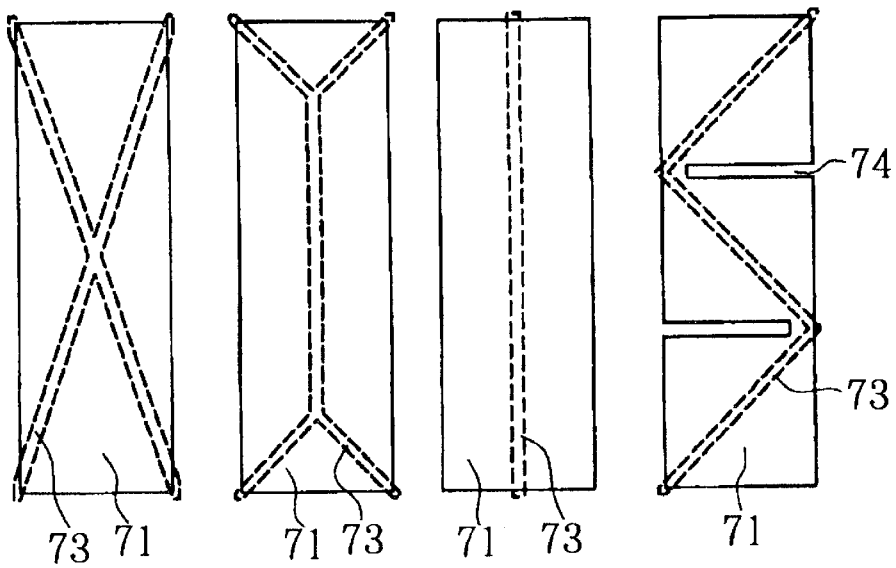

unit electrode(i)

aperture section 74 or end portion of picture element electrode 76

73 ;control electrode

71 ;picture element electrode unit electrode(j)

unit electrode(k)

unit electrode(l)

unit electrode(m)

unit electrode(n)

electrode(o)

73; control electrode

71; picture element electrode electrode(p)

electrode(q)

aperture section 74 or end portion of picture element electrode 76 electrode(r)

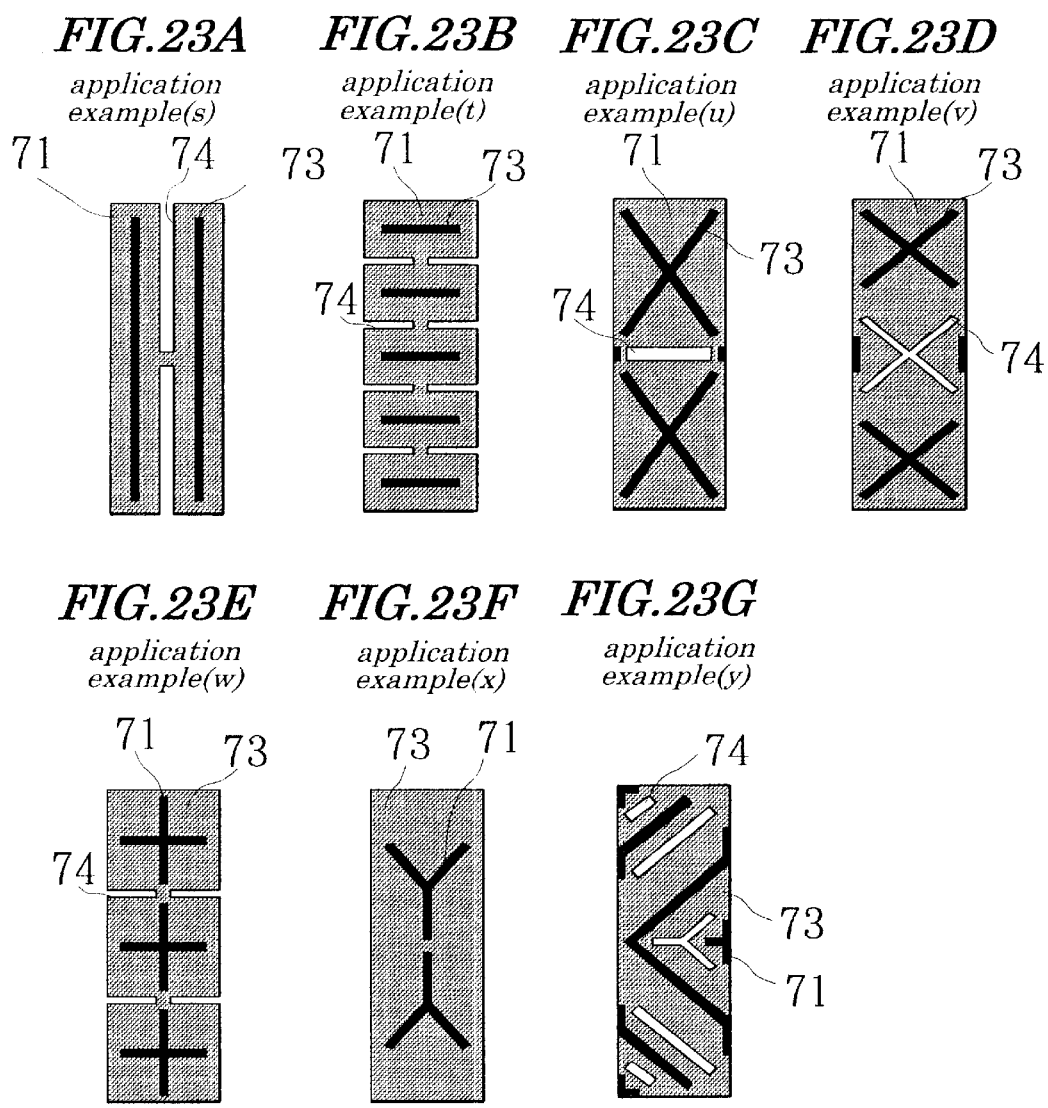

175
56; drain bus line
73; picture element electrode
57
58; drain terminal 177
172

MULTI-DOMAIN LIQUID CRYSTAL DISPLAY DEVICE

BACKGROUND OF THE INVENTION

1. Field of the Invention

The present invention relates to a liquid crystal display device and more particularly to a multi-domain liquid crystal display device being excellent in viewing angle characteristics.

2. Description of the Related Art

A conventional Twisted Nematic (TN) type liquid crystal display device being widely used is so constructed that, as a liquid crystal molecule changes a direction of its director (orientation vector) toward an electric field in response to a voltage applied thereto, a state displaying a "bright" color appearing at a time of applying no voltage, in which the liquid crystal molecule is in a twisted state being parallel to a substrate surface, is gradually changed to a state displaying a "black" color. However, the conventional TN-type liquid crystal device has a problem in that its viewing angle is small due to a limitation associated with behaviors of the liquid crystal molecule activated by the applied voltage. The small viewing angle is remarkable in a rising direction of the liquid crystal molecule f or displaying gray shades in particular.

A method of improving viewing angle characteristic of the liquid crystal display device is disclosed in Japanese Patent Application Laid-open No. Hei6-43461. FIG. 47 is a partial schematic cross-sectional view showing a pixel of the conventional multi-domain liquid crystal display device disclosed in the above patent application. In the disclosed technology, viewing angle characteristic is improved by obtaining a liquid crystal cell by orientating a liquid crystal molecule 22 having negative dielectric constant anisotropy in a homeotropic direction and then putting it between two polarizers (not shown) in which polarization axes are intersected at right angles and using common electrodes 81 having an aperture section 74 to concentrate an electric field on a skew in each pixel and to cause each pixel to be divided into more than two domains, that is, multi-domains. Moreover, in this technology, the viewing angle for the black color can be improved by using an optical compensating plate as necessary. Furthermore, the viewing angle characteristic is improved in not only the liquid crystal cell obtained by homeotropic orientation of the liquid crystal but also in the liquid crystal cell obtained by TN orientation of a liquid crystal by using the common electrodes 81 having the aperture section 74, by causing a skew electric field to be generated and by dividing each pixel into more than two domains.

Another technology to try to improve a viewing angle characteristic is disclosed in Japanese Patent Application Laid-open No. Hei7-199190. In the disclosed technology, the liquid crystal domain is stabilized by providing a common electrode with an aperture section (serving as an orientation control window), by mounting an orientation control electrode in a manner that it surrounds a pixel electrode and by enhancing a skew electric field in an area surrounding the pixel.

Additionally, Japanese Patent Application Laid-open No. Hei7-230097 also discloses a technology to improve a viewing angle characteristic in which an orientation control electrode formed integrally with a gate bus line is provided on each pixel and each pixel is divided into more than two liquid crystal domains by a skew electric field generated by the orientation control electrode.

Furthermore, in technology disclosed in Japanese Patent Application Laid-open No. Hei10-20323, a pixel is provided with an aperture section and a control electrode is placed at a position of the aperture section to form a plurality of liquid crystal domains.

Also, in technology disclosed in Japanese Patent Application Laid-open No. Hei10-301114, in a liquid crystal cell obtained by orientating a liquid crystal having a negative dielectric constant in a homeotropic direction, an orientation film is provided with a protrusion and a tilt direction of the liquid crystal is controlled by the protrusion at a time of applying a voltage to divide each pixel into more than two domains.

However, the technology disclosed in the Japanese Patent Application Laid-open No. Hei6-43461,in which the common electrodes 81 are provided with the aperture section 74, has a problem in that microfabrication processes such as a "photoresist process for the common electrode" or a like are required to fabricate a pixel, which are not required in the production processes of an ordinarily used mono-domain type TN liquid crystal display device, and further highly sophisticated technology of laminating upper and lower substrates is also required. This problem presents a serious problem especially in a case of fabricating an ordinary active matrix liquid crystal display device using a switching device such as a TFT (Thin Film Transistor). That is, in the ordinary active matrix liquid crystal display device, when the switching device (active device) such as the TFT is mounted on one transparent substrate (TFT substrate), the microfabrication processes including the photoresist process or the like is required only on the TFT substrate side and is not required by an electrode on an other transparent substrate (opposed substrate) side usually called a "common electrode". However,in the conventional technology in which the common electrode is provided with the aperture section, the microfabrication processes such the photoresist process as not required in the ordinary cases is required for fabricating the above common electrode, thus causing increased numbers of processes for production of the device and highly sophisticated technology of laminating upper and lower substrates to be required.

To solve this problem, one would think of a technology in which an orientation of the liquid crystal can be controlled by mounting an aperture section or a slit on the pixel electrode formed on a TFT-formed substrate side in which a switching device such as the TFT or a like is mounted to make the pixel electrode generate a skew electric field. This is because the fabrication of the pixel electrode on the TFT substrate side originally requires a patterning process and therefore does not require additional further processes. However, it is impossible to control a liquid crystal domain in a stable manner by such methods. A reason is that, although a tilt direction of an electric field in an area surrounding the aperture section occurring when the aperture section is mounted on the common electrode as disclosed in the Japanese Patent Application No. Hei6-43461, is matched to a tilt direction of the electric field in an area surrounding the pixel electrode 71 (see FIG. 19), a tilt direction of the electric field in the area surrounding the aperture section occurring when the aperture section is mounted on the pixel electrode formed on the TFT substrate side is not matched to the tilt direction of the electric field in the area surrounding the pixel electrode.

If the control electrode is disposed in the area surrounding the picture electrode as shown in the Japanese Patent Application Laid-open No. Hei7-199190, although skewing of the electric field in the area surrounding the pixel electrode can be enhanced, since it is necessary to mount the aperture section on the common electrode in the substrate existing on the opposite side, the above problem cannot be solved.

If the control electrode is disposed on the picture electrode and a potential of the control electrode is set to an appropriate level as shown in the Japanese Patent Application Laid-open No. Hei7-230097, it is possible to generate the required skew electric field. However, since state of occurrence of the skew electric field is also changed by a change in polarity of the pixel electrode potential at a time of driving in an inverted manner when the polarity of the pixel electrode potential is inverted at a predetermined period, stable and reliable control on the liquid crystal domain is impossible. Moreover, since the control electrode is so constructed integrally with a gate bus line and the control electrode potential cannot be suitably changed in accordance with ON/OFF operations of the pixel, the electric field in a skew direction occurs even at a time of the OFF operation (time of displaying the dark state) of the pixel, which causes a leak of light in the area surrounding the control electrode, thus resulting in degraded display contrast. If a light blocking layer is provided to prevent such light leak, a great decrease in aperture rate may occur. Furthermore, in ordinary cases, because a DC voltage is applied to the common electrode through the gate bus line during a period except period for selecting the pixel, if the control electrode is constructed integrally with the gate bus line, the DC voltage continues to be applied to a liquid crystal layer in the area for displaying, thus causing the degradation of the reliability in a display device.

Even in the technology disclosed in the Japanese Patent Application Laid-open No.Hei10-20323 in which the pixel electrode is provided with the aperture section and the control electrode is placed at the position of the aperture section, since no means is provided for controlling the control electrode potential for every pixel at a time of the display operation, as in the case of the Japanese Patent Application Laid-open No. Hei7-230097, there still remains a problem in that stable and reliable control on the liquid crystal domain is impossible.

To solve these problems in the conventional technologies as disclosed in the Japanese Patent Application Laid-open Nos. Hei7-230097and Hei10-20323, a technology may be available in which the control electrode individually mounted for each pixel can be controlled by switching devices each being individually mounted for each pixel. However, in this technology, since the switching device and the drain bus line have to be individually and separately mounted corresponding to each of pixel electrodes and of control electrodes, configurations of the device is made complicated accordingly and such devices are not realistic in terms of their production cost and yield.

The technology disclosed in the Japanese Patent Application Laid-open No. Hei10-30114 in which the orientation film is provided with the protrusion has also a problem in that division of the area by using the protrusion is effective only in vicinity of the protruded area and, therefore, in order to realize the reliable division of the area, it is necessary to form the protrusion not only on the orientation film of the TFT substrate existing on one side where the switching device is formed, but also on the orientation film on the opposed substrate side, this causes great increases in the processes and further the technology cannot be realized without very exact lamination process of both substrates.

The inventors of the present invention have already disclosed a technology in Japanese Patent Application No. Hei11-180615 in which a signal voltage is applied to a control electrode directly connected to a switching device and a partial voltage of the signal voltage is applied to a pixel electrode through a coupling capacitor. According to the disclosed technology, two potentials of the control electrode and pixel electrode can be easily controlled by one switching device, which allows an orientation state of a liquid crystal divided into a plurality of areas to be achieved and which can provide an image being excellent in a viewing angle characteristics.

SUMMARY OF THE INVENTION

In view of the above, it is an object of the present invention to provide a multi-domain liquid crystal display device capable of making more reliable the effects obtained by the technology disclosed in the Japanese Patent Application No. Hei11-180615, of solving problems associated with conventional technologies including increased complicated processes such as microfabrication processes required for fabricating a common electrode and necessity for highly sophisticated laminating technology and of providing sharp contrast and excellent viewing angle characteristics.

According to a first aspect of the present invention, there is provided a multi-domain liquid crystal display device including:

a liquid crystal held and put between a pair of substrates;

two or more gate bus lines formed on one of the substrates and extending horizontally;

two or more drain bus lines extending vertically;

a plurality of pixels each being formed corresponding to each point of intersection of the gate bus lines and the drain bus lines and being arranged in a matrix form; and whereby each pixel described above is provided with a switching device to select a desired pixel, with a pixel electrode and with a control electrode operating to form two or more orientation areas within one pixel by generating a skew electric field acting on the liquid crystal and wherein the control electrode is connected to one of terminals of the switching device and a coupling capacitor is connected between the pixel electrode and the control electrode and wherein a signal voltage is applied from the corresponding drain bus line through the corresponding switching device at a time of selecting the corresponding gate line and a partial voltage of the signal voltage is applied to the pixel electrode through the coupling capacitor.

In the foregoing, a preferable mode is one wherein the pixel electrode is formed under the control electrode and an interlayer dielectric is formed between the pixel electrode and the control electrode.

Also, a preferable mode is one wherein an aperture section is formed on the pixel electrode.

Also, a preferable mode is one wherein the control electrode controls an electric field acting on an orientation state of the liquid crystal through the aperture section.

Also, a preferable mode is one that wherein includes a common capacitor line to add capacitance to the pixel electrode.

Also, a preferable mode is one wherein the common capacitor line is disposed at the aperture section.

Also, a preferable mode is one that wherein includes a coupling capacitor having predetermined capacitance between the pixel electrode and the common capacitor line.

Also, a preferable mode is one wherein a part of the control electrode is composed of a transparent electrode.

Also, a preferable mode is one wherein the control electrode has quarter-wave plates at each side of a liquid crystal layer, which is formed in a manner that optic axes of the quarter-wave plates are intersected at right angles.

Also, a preferable mode is one wherein quarter-wave plates are provided on both sides of the liquid crystal and the quarter-wave plates are placed in a manner that their optic axes are intersected at right angles.

Also, a preferable mode is one wherein the switching device is a TFT (Thin Film Transistor) having a bottom gate structure.

Also, a preferable mode is one wherein the switching device is a TFT having a top gate structure.

Also, a preferable mode is one wherein the interlayer dielectric is formed integrally with a passivation film of the TFT.

Also, a preferable mode is one wherein the control electrode is formed integrally with a source terminal of the TFT.

Also, a preferable mode is one wherein the aperture section is formed in a window-like shape.

Also, a preferable mode is one wherein the aperture section is formed in a manner that incisions are exercised from one side or both sides of the pixel electrode.

Also, a preferable mode is one that wherein includes a resistor device to discharge electric charges accumulated in the pixel electrode between the pixel electrode and control electrode.

Also, a preferable mode is one wherein the resistor device has a substantially finite resistance value.

Also, a preferable mode is one that wherein includes a resistor device having a substantially finite resistance value disposed between the pixel electrode and common capacitor line.

Also, a preferable mode is one wherein an operation mode of the liquid crystal is a TN (Twisted Nematic) mode in which the liquid crystal having positive dielectric constant anisotropy is orientated in a twisted manner.

Also, a preferable mode is one wherein the liquid crystal is spontaneously chiral.

Also, a preferable mode is one wherein the liquid crystal is unspontaneously chiral.

Also, a preferable mode is one wherein the operation mode of the liquid crystal is a homogeneous mode in which the liquid crystal having positive dielectric constant anisotropy is orientated in a uniform manner.

Also, a preferable mode is one wherein the operation mode of the liquid crystal is a VA (Vertical Alignment) mode in which the liquid crystal having negative dielectric constant anisotropy is orientated in a homeotropic direction.

Also, a preferable mode is one wherein the pixel electrode is constructed of two or more fine pixel electrodes each being a square in shape and the control electrode is disposed along one side of the square and remaining three sides constitute a part of the aperture section or end portion of the pixel electrode.

Also, a preferable mode is one wherein the pixel electrode is constructed of two or more fine pixel electrodes each being a square in shape and the control electrode is disposed along two sides of the square and remaining two sides constitute a part of the aperture section or end portion of the pixel electrode.

Also, a preferable mode is one wherein the square is almost regular square.

Also, a preferable mode is one wherein the pixel electrode is constructed of two or more fine pixel electrodes each being a triangle in shape and the control electrode is disposed along two sides of the triangle and remaining one side constitutes a part of the aperture section or the pixel electrode end portion.

Also, a preferable mode is one wherein the pixel electrode is constructed of two or more fine pixel electrodes each being a triangle in shape and the control electrode is disposed along one side of the triangle and remaining two sides constitute a part of the aperture section or the pixel electrode end portion.

Also, a preferable mode is one wherein the pixel electrode is constructed of two or more fine pixel electrodes each being a pentagon in shape and the control electrode is disposed along two sides of the pentagon and remaining three sides constitute a part of the aperture section or the pixel electrode end portion.

Also, a preferable mode is one wherein the pixel electrode is constructed of a plurality of fine pixel electrodes and the fine pixel electrodes are constructed by a combination of more than two kinds of the fine pixel electrodes stated above.

Also, a preferable mode is one wherein a ratio of the control electrode voltage applied to the control electrode, relative to a voltage of the common electrode, to a pixel electrode voltage applied to the pixel electrode, relative to a voltage of the common electrode, is set to 1.1 to 1.4.

Also, a preferable mode is one wherein a ratio of the control electrode voltage to the pixel electrode voltage is set to 1.2 to 1.4.

Also, a preferable mode is one wherein a ratio of the control electrode voltage to the pixel electrode voltage is set to about 1.3.

Also, a preferable mode is one wherein the minute orientation area in which the liquid crystal is orientated in a uniform manner is about $20 \cdot m^2$ or less in size.

Also, a preferable mode is one wherein the minute orientation area in which the liquid crystal is orientated in a uniform manner is about $40 \cdot m^2$ or less in size.

Also, a preferable mode is one wherein the minute orientation area in which the liquid crystal is orientated in a uniform manner is $20 \cdot m^2$ to $40 \cdot m^2$ in size.

Also, a preferable mode is one wherein at least a part of the coupling capacitor is constructed by having a coupling capacitor terminal electrically connected to either of the pixel electrode or the control electrode overlain by other electrode to which the coupling capacitor terminal is not connected, with a gate insulating film interposed between them.

Also, a preferable mode is one wherein at least a part of the coupling capacitor is constructed by having an additional capacitor terminal electrically connected to either of the pixel electrode or common capacitor line overlain by other electrode to which the additional capacitor terminal is not connected, with a passivation film interposed between them.

Also, a preferable mode is one wherein at least a part of the coupling capacitor is constructed by having an additional capacitor terminal electrically connected to either of the pixel electrode or common capacitor line overlain by other electrode to which the additional capacitor terminal is not connected, with a gate insulating film interposed between them.

Also, a preferable mode is one that wherein includes a discharging device to discharge an electric charge accumulated at the pixel electrode mounted on the gate bus line corresponding to a front stage of an arbitrary pixel.

Furthermore, a preferable mode is one wherein the passivation film is removed from the area corresponding to the aperture section, out of aperture sections formed on the pixel electrode, on which a control electric field generated by the control electrode disposed in the lower layer acts.

According to a second aspect of the present invention, there is provided a multi-domain liquid crystal display device including:

a liquid crystal put between a pair of substrates;

a plurality of pixels disposed in a matrix form on one of the substrates;

a switching device mounted in each of the pixels;

a pixel electrode mounted in each of the pixels;

a control electrode mounted in each of the pixels and operated to generate skew electric fields acting on the liquid crystal to form two or more orientation areas in one pixel; and whereby the control electrode is connected to one terminal of the switching device and wherein a coupling capacitor is connected between the pixel electrode and the control electrode and wherein a signal voltage is applied through the corresponding switching device to the control electrode and a partial voltage of the signal voltage is applied through the coupling capacitor to the pixel electrode.

BRIEF DESCRIPTION OF THE DRAWINGS

The above and other objects, advantages and features of the present invention will be more apparent from the following description taken in conjunction with the accompanying drawings in which:

FIGS. 20A to 20H are top views showing combinations of the pixel electrode with the control electrode of the multi-domain liquid crystal display device according to a sixth embodiment of the present invention;

FIGS. 23A to 23G are top views of examples in which the above combinations of the pixel electrode with the control electrode are applied to the multi-domain liquid crystal display device according to the sixth embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
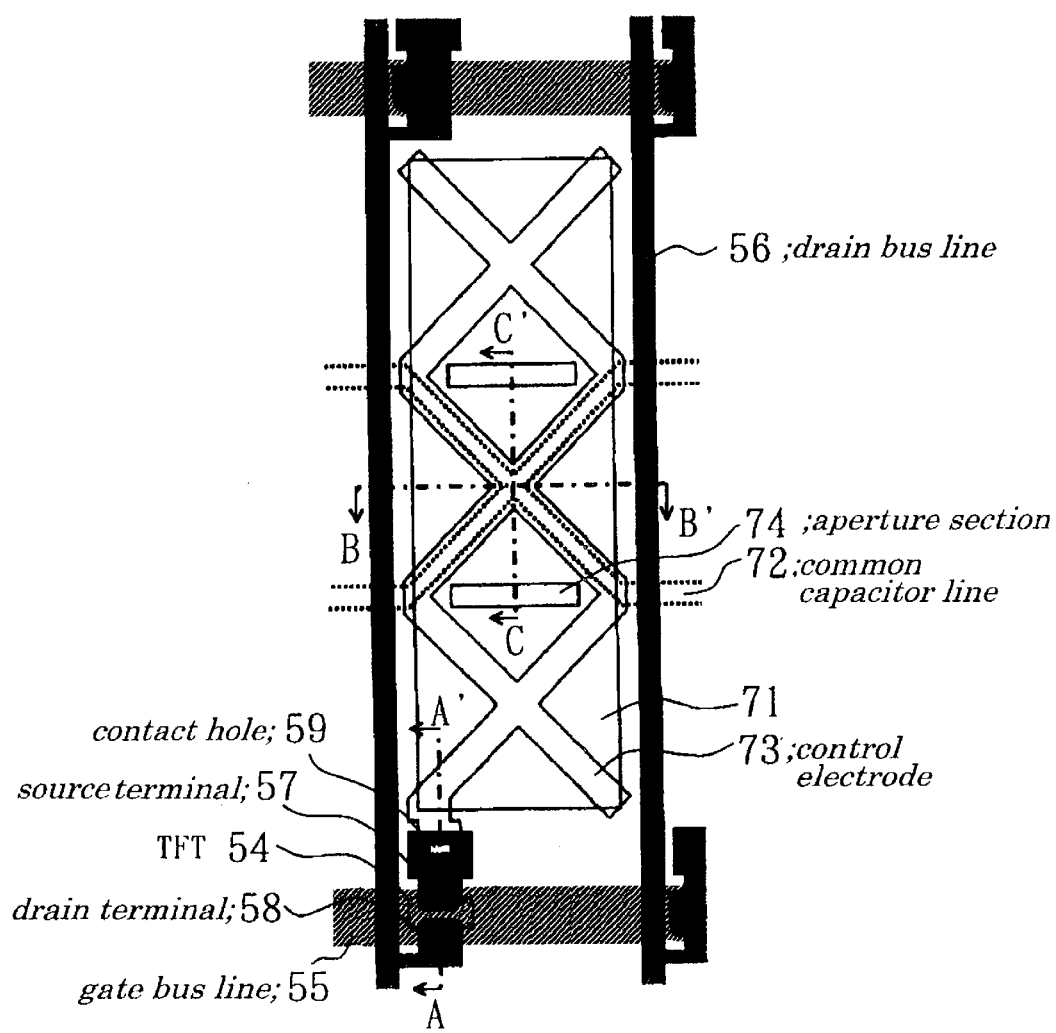
FIG. 1 is a schematic top view of configurations of a pixel employed in a multi-domain liquid crystal display device according to a first embodiment of the present invention.
Figure 2:
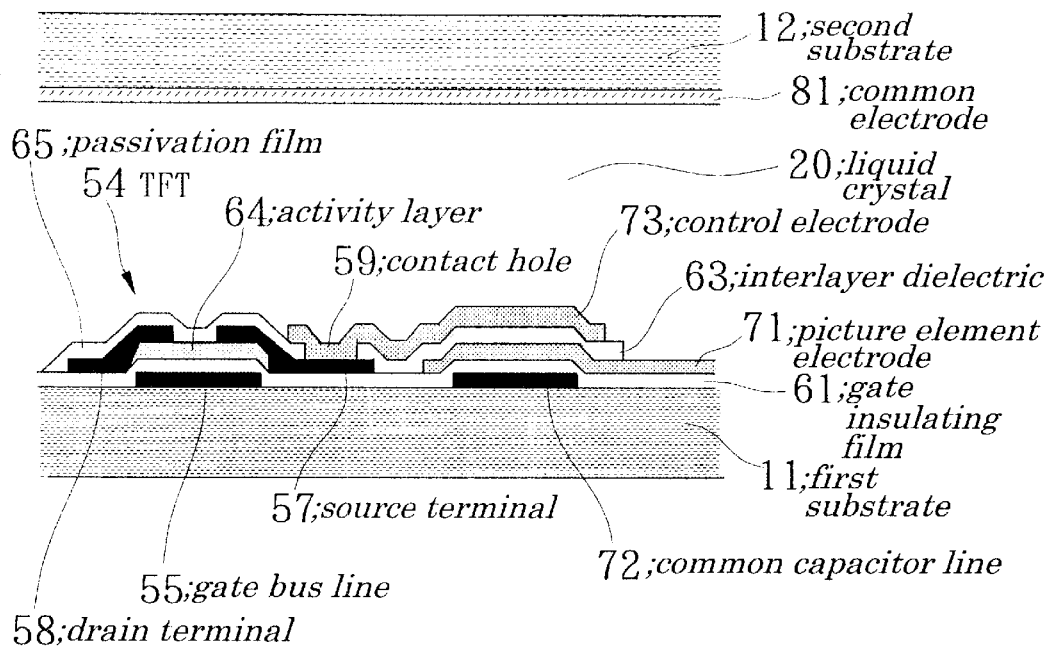
FIG. 2 is a schematic cross-sectional view of the pixel employed in the multi-domain liquid crystal display device of FIG. 1 taken along the line A–A'.
Figure 3:
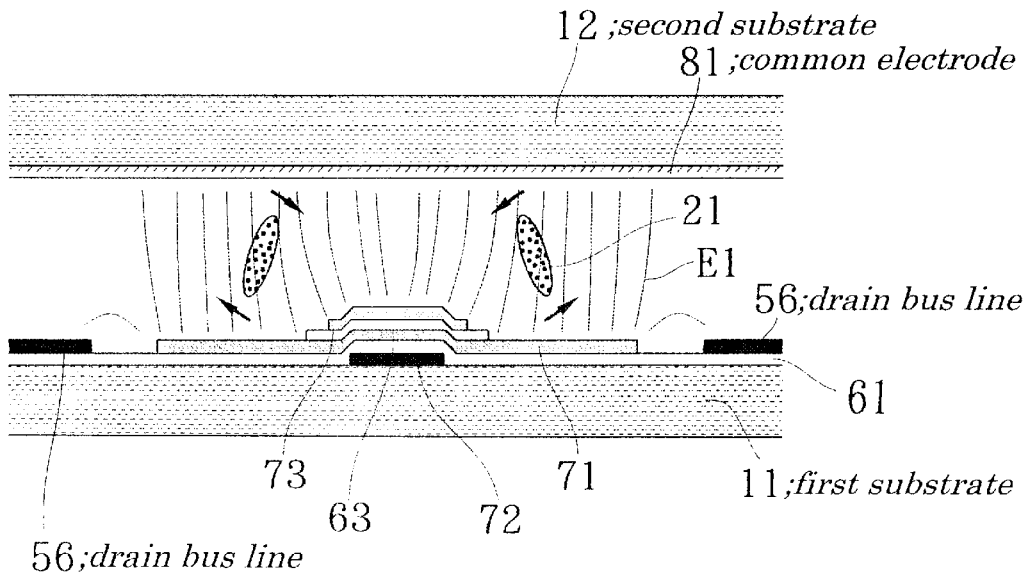
FIG. 3 is a schematic cross-sectional view of the pixel employed in the multi-domain liquid crystal display device of FIG. 1 taken along the line B–B'.
Figure 4:
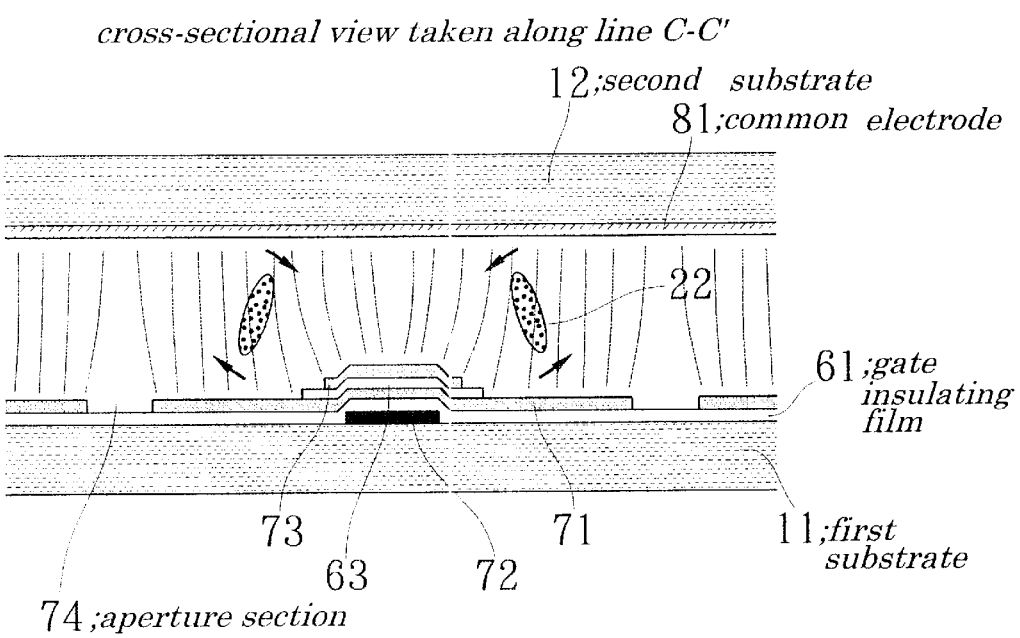
FIG. 4 is a schematic cross-sectional view of the pixel employed in the multi-domain liquid crystal display device of FIG. 1 taken along the line C–C'.
Figure 5:
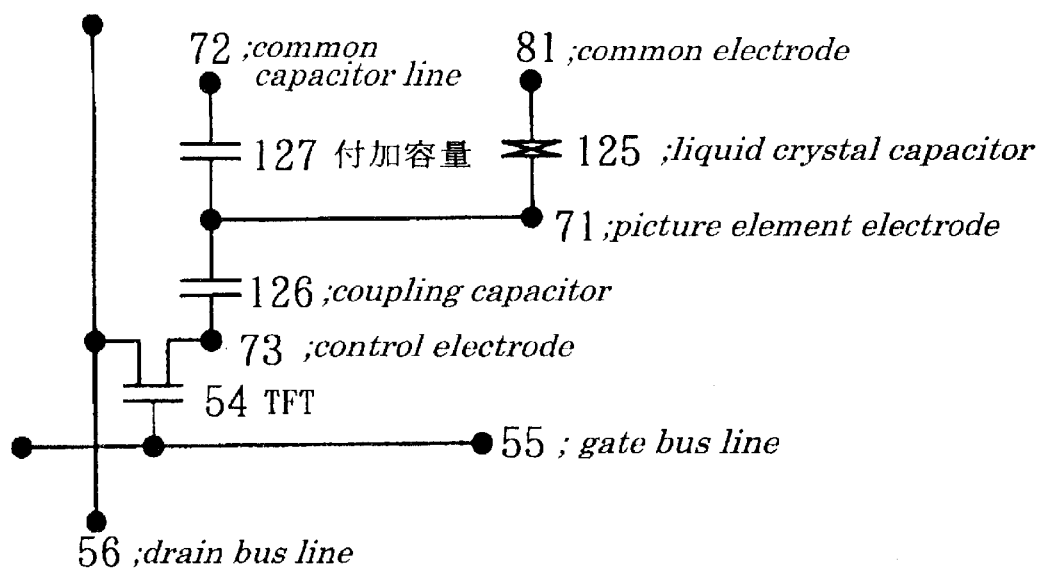
FIG. 5 is an equivalent circuit of the pixel employed in the multi-domain liquid crystal display device according to the first embodiment of the present invention.
Figure 6A:
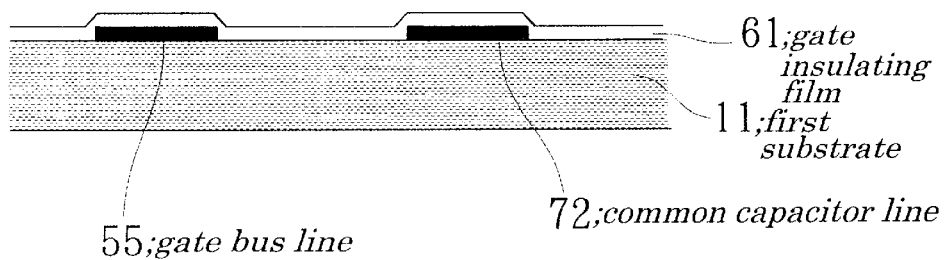
FIGS. 6A and 6B are process diagrams showing a method of producing the multi-domain liquid crystal display device of FIG. 1.
Figure 6B:
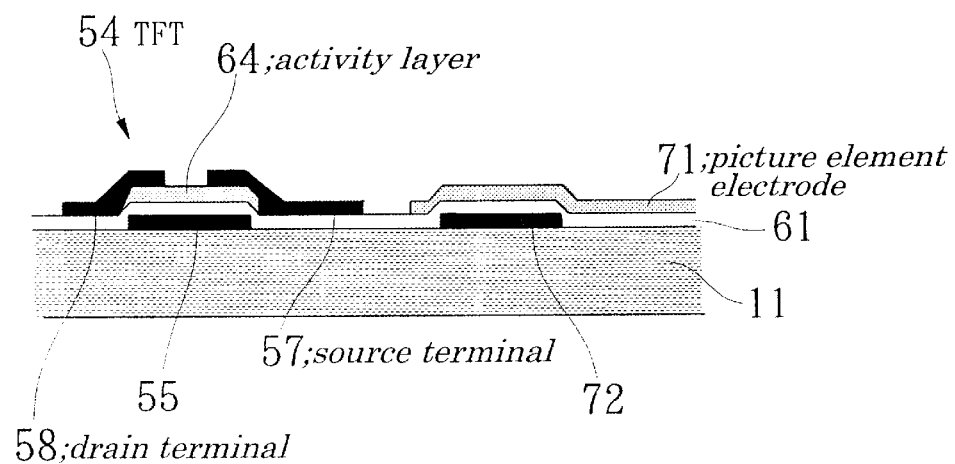
Figure 7A:
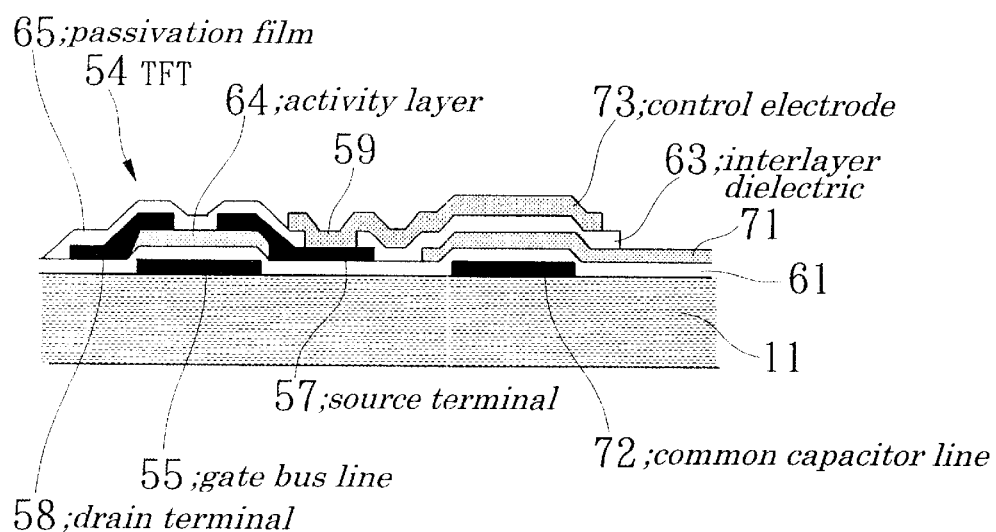
FIGS. 7A and 7B are process diagrams showing the method of producing the multi-domain liquid crystal display device of FIG. 1.
Figure 7B:
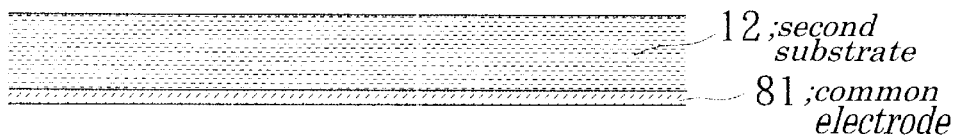

FIG. 1 is a schematic top view of configurations of a pixel of a multi-domain liquid crystal display device according to a first embodiment of the present invention. FIG. 2 is a schematic cross-sectional view of the pixel of the multi-domain liquid crystal display device of FIG. 1 taken along a line A–A'. FIG. 3 is a schematic cross-sectional view of the pixel of the multi-domain liquid crystal display device of FIG. 1 taken along a line B–B'. FIG. 4 is a schematic cross-sectional view of the pixel of the multi-domain liquid crystal display device of FIG. 1 taken along a line C–C'. FIG. 5 is an equivalent circuit of the pixel of the multi-domain liquid crystal display device according to the first embodiment. FIGS. 6A and 6B are process diagrams showing a method of producing the multi-domain liquid crystal display device of FIG. 1. FIGS. 7A and 7B are also process diagrams showing the method of producing the multi-domain liquid crystal display device of FIG. 1.

As shown in FIGS. 1 through 5, one pixel of the multi-domain liquid crystal display device includes one area surrounded by two lines out of a plurality of gate bus lines 55 extending horizontally and by two lines out of a plurality of drain bus lines 56 extending vertically. Each pixel is formed on a first substrate 11 repeatedly in up/down and right/left directions in a matrix manner.

Each pixel has a TFT 54, a pixel electrode 71 and a control electrode 73. The TFT 54 is of a bottom gate structure in which a gate is placed in a position lower than those for a source and drain of the TFT 54. Amorphous silicon or poly-silicon can be used as a material for a activity layer 64 (semiconductor layer) and can be formed by self alignment technology. The pixel electrode 71 is in an electrically floating state. A coupling capacitor 126 includes the control electrode 73 and a semiconductor film 62, and a coupling capacitor 127 includes a common capacitor line 72 and a gate insulating film 61. The TFT 54 is covered by a passivation film 65. Silicon nitride or a like is used as a material for the semiconductor films 62 and the gate insulating film 61 and the passivation film 65. The common capacitor line 72 is provided to add capacitance to the pixel electrode 71. The capacitance of coupling capacitor 126 and coupling capacitor 127 can be set to a desired value depending on parameters such as materials, sizes, thickness or a like of the semiconductor films 62 and gate insulating film 61. The pixel electrode 71 and the control electrode 73 include transparent electrodes and use ITO (Indium Tin Oxide) or a like as their materials. The control electrode 73 is connected to a source terminal 57 of the TFT 54. The control electrode 73 can be formed integrally with the source terminal 57 of the TFT 54. Metal films made of chromium or a like are used to serve as a gate bus line 55, the source terminal 57, a drain terminal 58 and the common capacitor line 72. On a second substrate 12 is formed a common electrode 81 which is overlain so as to be positionally opposed to the first substrate 11 with a predetermined interval. A liquid crystal 20 is held and put between the first substrate 11 and the second substrate 12. According to the first embodiment, the TFT 54 is of the bottom gate structure, however, as described in a fifth embodiment, it may be of a top gate structure in which the gate of the TFT 54 is placed in a position lower than those for its source and drain.

Moreover, in the first embodiment, the common capacitor line 72 is provided to add capacitance to the pixel electrode 71, however, if a necessary difference in a potential can be obtained between the coupling capacitor 126 connected between the pixel electrode 71 and the control electrode 73 and a liquid crystal capacitor 125 connected between the pixel electrode 71 and the common electrode 81, it is not required.

According to this embodiment, as shown in FIG. 5, at an instant of selecting the gate bus line 55, a signal voltage is fed through the TFT 54 from the drain bus line 56 to the control electrode 73 connected to the source terminal 57 (not shown in FIG. 5) and its voltage level is written therein. Potential of the pixel electrode 71 that have been electrically floating is determined to be a predetermined one occurring between the control electrode 73 and the common capacitor line 72 in accordance with a ratio of capacitance among the coupling capacitors 126 and 127 and the liquid crystal capacitor 125. The common capacitor line 72 may be constructed so that it is at a same potential as that of the common electrode 81 formed on the second substrate 12. The common capacitor line 72 may be connected to the gate bus line 55.

Furthermore, according to this embodiment, since the potential becomes higher in order of the control electrode 73, pixel electrode 71 and common electrode 81 or in the reverse order, a liquid crystal driving electric field E1 between the common electrode 81 and pixel electrode 71 and the control electrode 73 occurs on a skew so as to be extended from the control electrode 73 to outside as shown in FIG. 3.

Next, operations of the liquid crystal 20 will be described hereinafter, by referring to FIGS. 3 and 4 and by taking a VA (Vertical Alignment) mode case as an example, in which the liquid crystal having negative dielectric constant anisotropy is orientated in a homeotropic direction. Orientation state of the liquid crystal 20 (or a liquid crystal molecule 21) held and put between the first substrate 11 and the second substrate 12 is changed by an influence of the liquid crystal driving electric field E1. As described above, in this embodiment, since the liquid crystal driving electric field E1 occurs in a manner that it extends from the control electrode 73 to the outside, as shown in FIGS. 3 and 4, the orientation of the liquid crystal molecule 21 is changed in different directions on each side of the control electrode 73. This allows visual field in areas having different orientation directions of the liquid crystal molecule 21 to be compensated for, thus providing a symmetric and excellent viewing angle characteristic. Moreover, in the above description, although the liquid crystal 20 existing in the form of a bulk is represented as the liquid crystal 20 and an individual liquid crystal molecule is represented as the liquid crystal molecule 21, the difference between them is of no importance in the present invention.

In the above description, to explain operations of the liquid crystal 20, the VA mode is used. However, same effects can be obtained even in the case of using the TN mode in which the liquid crystal having positive dielectric constant anisotropy is orientated in a twisted manner as well as in a case of a homogenous mode in which the liquid crystal 20 having positive dielectric constant anisotropy is orientated in a uniform manner. In a case of using the TN mode, the liquid crystal 20 may be either spontaneously chiral or unspontaneously chiral. If the liquid crystal is unspontaneously chiral, by the above liquid crystal driving electric field E1, operation of the liquid crystal can be made possible in a plurality of areas having different chiral directions. In order to stabilize the liquid crystal domain, a high-molecular compound may be mixed with the liquid crystal. Moreover, after adding a monomer to the liquid crystal and forming domains, by making the liquid crystal high-molecular, the domains can be stabilized as well.

As shown in FIG. 4, it is possible to make formation of the liquid crystal domain more reliable by providing the pixel electrode 71 with a suitable aperture section 74. The aperture section 74 may be formed to be of a window-like shape or may be formed in a manner that incisions are exercised from one side or both sides of the pixel electrode 71. It is needless to say that the present invention can be realized without a mounting of such aperture section 74 as described above. As in a fourth embodiment described later, in the first embodiment, a color layer (not shown) or light blocking layer (not shown) can be formed on the first substrate 11 or second substrate 12. Furthermore, a part or a whole of the common capacitor line 72 can includef transparent electrodes.

Next, a method of producing the multi-domain liquid crystal display device of the first embodiment will be described in order of processes by referring to FIG. 6 and FIG. 7.

As shown in FIG. 6A, a film was formed on a whole surface of the first substrate 11 made of glass by sputtering with chromium and the gate bus line 55 and the common capacitor line 72 were formed by patterning using photolithography technology on a chromium film so as to obtain a desired shape. Then, by using a CVD (Chemical Vapor Deposition) method, a film made of silicon nitride and the gate insulating film 61 were formed.

Next, as shown in FIG. 6B, the amorphous silicon film was formed on the whole surface using the CVD method and an activity layer 64 was formed by patterning using photolithography technology on the amorphous silicon film so as to have a desired shape. Then, after a film was formed on the whole surface by sputtering with chromium, the drain bus line 56, drain terminal 58 and source terminal 57 were formed by patterning using photolithography technology on the chromium film so as to have a desired shape. After sputtering with ITO on the whole surface, the pixel electrode 71 having the aperture section 74 was formed by patterning using photolithography technology so as to have a desired shape. The pixel electrode 71 was in the electrically floating state as described above. Thus, the TFT 54 was formed on the first substrate 11.

Next, as shown in FIG. 7A, after a silicon nitride film was formed on the whole surface by the CVD method, the semiconductor film 62, passivation film 65 of the TFT and a contact hole 59 with the source terminal 57 exposed at a bottom of the contact hole 59 were formed by patterning on the silicon nitride film using photolithography technology so as to have a desired shape. At this point, the semiconductor film 62 may be formed integrally with the passivation film 65. Then, after a film was formed on the whole surface by sputtering with the ITO, the control electrode 73 was formed by patterning on the ITO film so as to have a desired shape using photolithography technology. The control electrode 73 was connected to a source terminal 57 through the contact hole 59.

Next, as shown in FIG. 7B, after a color layer (not shown) including R (Red), G (Green) and B (Blue) color layers and a black matrix (not shown) were formed on the second substrate 12 made of glass and a film was formed by sputtering with the ITO thereon, the common electrode 81 was formed by patterning on the ITO film by photolithography so as to obtain a desired shape.

On the first substrate 11 and second substrate 12 prepared by the above procedures was formed an orientation film (not shown) for orientating the liquid crystal molecule 21 in a vertical direction. A product E-1211 manufactured by Nissan Chemical Ltd. was used as a material for the orientation film. Then, after applying a seal material (not shown) to the first substrate 11 and after scattering spherical spacers (not shown) on the second substrate 12, both first substrate 11 and second substrate 12 were laminated and the seal material was hardened by heating. Next, after cutting a structure of the first substrate 11 and the second substrate 12, both of which were formed integrally with the seal material, so as to be matched to a size of a panel and after injecting a nematic fluid crystal having negative dielectric constant anisotropy through an injection hole, the injection hole was sealed with light-setting resin. Then, after sticking a negative compensating film on both sides of the panel, a polarizer is fixed in a manner that its transmission axes are intersected at right angles and a peripheral driving circuit was mounted to achieve modulation and the multi-domain liquid crystal display device of this embodiment as shown in FIG. 1 to FIG. 4 was manufactured.

A top view showing each component of the multi-domain liquid crystal display device manufactured in accordance with the method of this embodiment is shown in FIG. 1 and the pixel is about 100·m across×about 300·m down in size. The top view of each component is not limited to that shown in FIG. 1 and a variety of shapes are available, for example, as shown in FIGS. 20A to 20H.

In the multi-domain liquid crystal display device of this embodiment, if the polarizer is mounted in a manner that its transmission axes are intersected at right angles, since, in each of main liquid crystal orientation areas, the tilt direction of the liquid crystal molecule 21 is matched to a direction where the transmission axes of the polarizer on both sides are divided into two equal parts, that is, to each of up/down and right/left directions, although an excellent bright state can be displayed by applying the liquid crystal driving electric field E1, there is a case where dark lines occur at a boundary section of each of the liquid crystal orientation areas. The reason for the above occurrence of the dark lines will be explained in the second embodiment. The occurrence of the dark lines can be prevented by inserting an optically anisotropic medium called a quarter-wave plate between the polarizer and the liquid crystal 20 so that circularly polarized light can be entered. Moreover, in this case, the control electrode 73 may be made of the transparent electrode.

Thus, in the multi-domain liquid crystal display device of this embodiment, since the control electrode 73 is connected to the source terminal 57 being one of the TFT 54 serving as the switching device, the pixel electrode 71 in which the aperture section is formed has the coupling capacitor 126 which is connected between the pixel electrode 71 and the control electrode 73 and since a partial voltage of the signal voltage is applied to the pixel electrode 71 through the coupling capacitor 126, the liquid crystal can be activated in a plurality of divided areas by the electric field in the skew direction which occurs in the areas surrounding the control electrode 73 and the pixel electrode 71 at a time of the operation.

Therefore, according to the first embodiment, the multi-domain liquid crystal display device having sharp contrast and excellent viewing angle characteristics can be provided without increased complicated processes including microfabrication of the common electrode and without necessity for highly sophisticated laminating technology.

Second Embodiment

Figure 8:
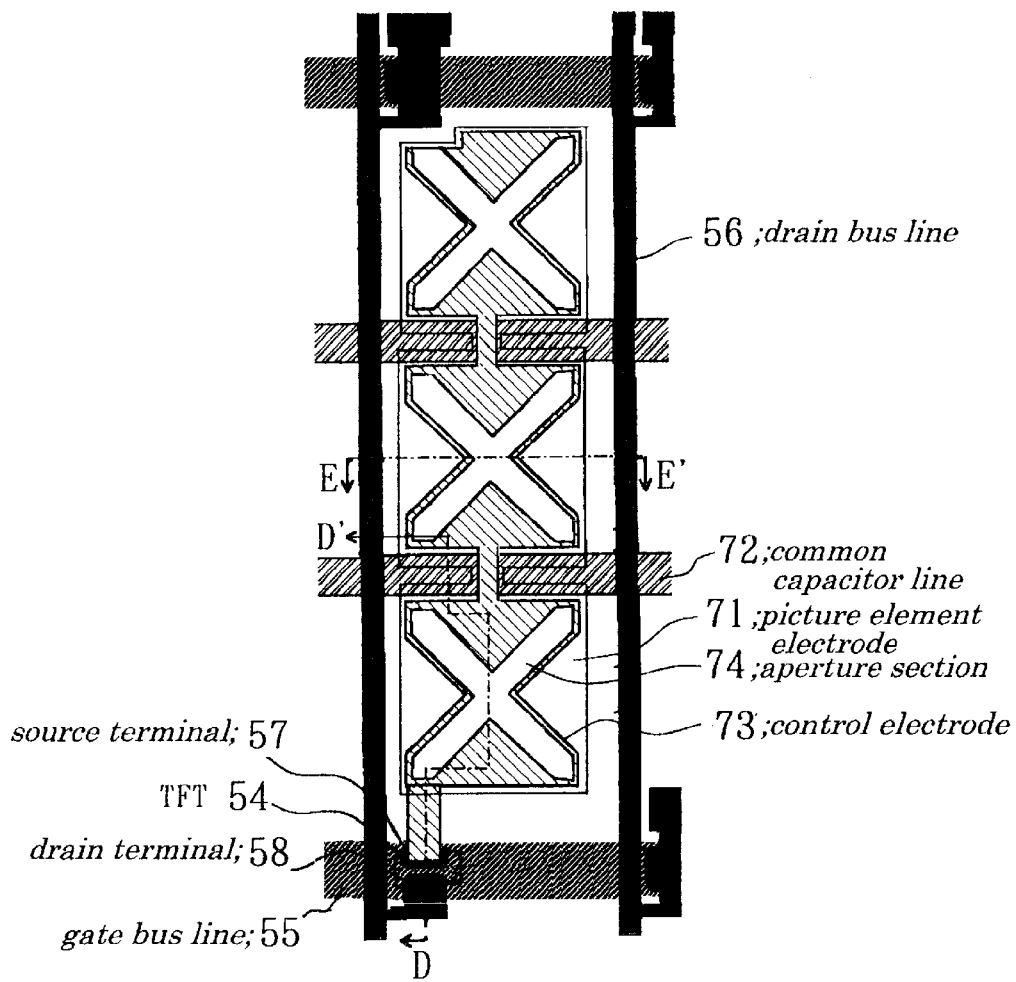
FIG. 8 is a schematic top view of configurations of a pixel employed in a multi-domain liquid crystal display device according to a second embodiment of the present invention.
Figure 9:
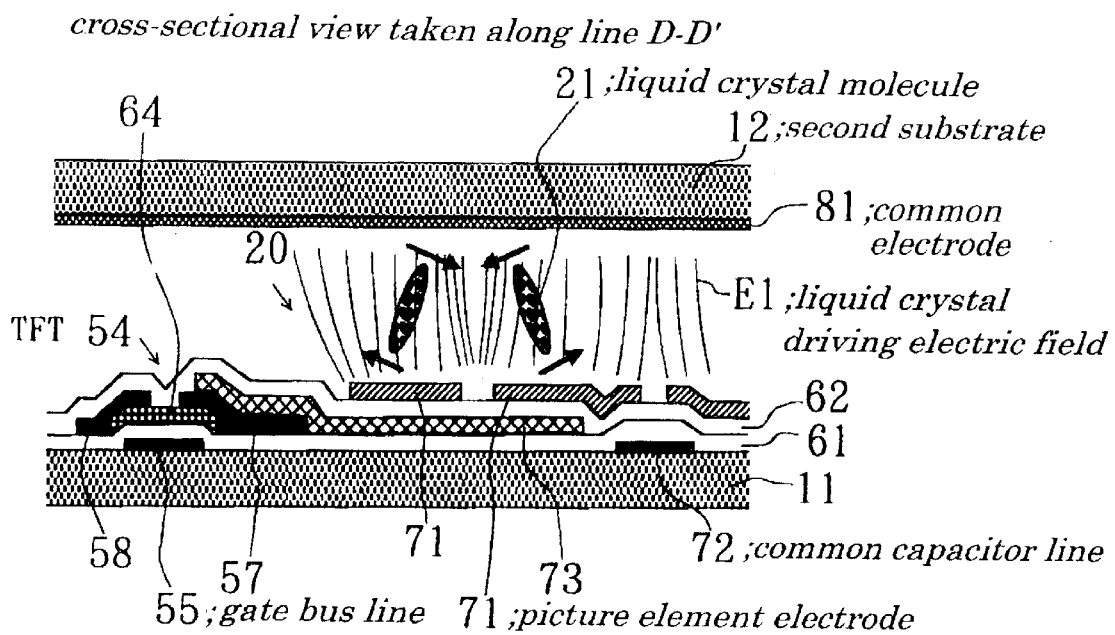
FIG. 9 is a schematic cross-sectional view of the pixel employed in the multi-domain liquid crystal display device of FIG. 8 taken along the line D–D'.
Figure 10:
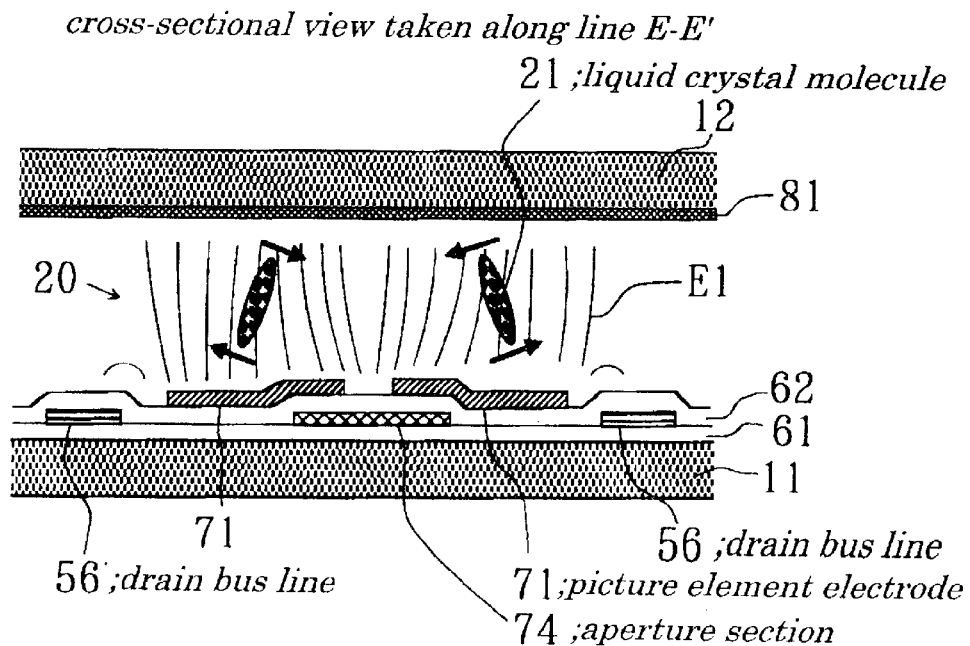
FIG. 10 is a schematic cross-sectional view of the pixel employed in the multi-domain liquid crystal display device of FIG. 8 taken along the line E–E'.

FIG. 8 is a schematic top view of configurations of a pixel of a multi-domain liquid crystal display device according to a second embodiment of the present invention. FIG. 9 is a schematic cross-sectional view of the pixel of the multi-domain liquid crystal display device of FIG. 8 taken along a line D–D'. FIG. 10 is a schematic cross-sectional view of the pixel of the multi-domain liquid crystal display device of FIG. 8 taken along a line E–E'.

Configurations of the multi-domain liquid crystal display device of the second embodiment differ greatly from those in the above first embodiment in that a control electrode is placed, as a lower layer, under a pixel electrode with an interlayer dielectric interposed between the control electrode and the pixel electrode. That is, in the multi-domain liquid crystal display device of this second embodiment, as shown in FIG. 8 to FIG. 10, pixels having configurations as shown in FIG. 8 are placed on a first substrate 11 repeatedly in a matrix form in up/down and right/left directions and a control electrode 73 made of an ITO or a like is formed under a pixel electrode 71 made of the ITO or the like, with an semiconductor film 62 made of silicon nitride interposed therebetween. The pixel electrode 71 is in an electrically floating state as in a case of the first embodiment. The control electrode 73 can be formed integrally with a source terminal 57 of a TFT 54, which is advantageous in terms of production efficiency. However, since the source terminal 57 is ordinarily made of opaque metal such as chromium, there is a disadvantage that light transmission rate of the device decreases accordingly. On an other hand, in a case where the control electrode 73 made with a transparent electrode made of the ITO or the like as described above, as shown in FIG. 8, even if a portion overlain by the pixel electrode 71 is secured so that the capacitance of a coupling capacitor 126 (FIG. 14) is sufficiently large, it is possible to obtain a satisfactory aperture rate.

According to this embodiment, although the control electrode 73 is formed under the pixel electrode 71, since the pixel electrode 71 is provided with an aperture section 74 and electric field from the control electrode 73 acts on the liquid crystal 20 through the aperture section 74, it is possible to cause the liquid crystal 20 to be activated in a plurality of divided areas. As in the case of the first embodiment, TFT 54 may be not only of a bottom gate structure but also of a top gate structure. Except those described above, configurations of the pixel in the second embodiment as shown in FIG. 8 to FIG. 10 are same as those in the first embodiment as shown in FIG. 1 to FIG. 5 and therefore same reference numbers in FIG. 8 to FIG. 10 designate corresponding parts in FIG. 1 to FIG. 5 and their descriptions are omitted accordingly.

The aperture section 74 of the pixel electrode 71 of this embodiment may be formed in window-like shape and by performing incisions from one side or both sides of the picture electrode 71. The formation of the liquid crystal domain is made more reliable by providing the pixel electrode 71 with a suitable aperture section 74 in areas other than those being acted on by electric field from the control electrode 73.

In the aperture section 74 which is acted on by the electric field generated by the control electrode 73, although a liquid crystal driving electric field E1 acts on in a manner that it extends from the aperture section 74, if there is no control electrode 73 at the aperture section 74 or if there is a common capacitor line 72 at the aperture section 14 as shown in FIG. 8 or FIG. 9, the liquid crystal driving electric field E1 acts on in a manner that it converges on center of a width of the aperture section 74.

Figure 11:
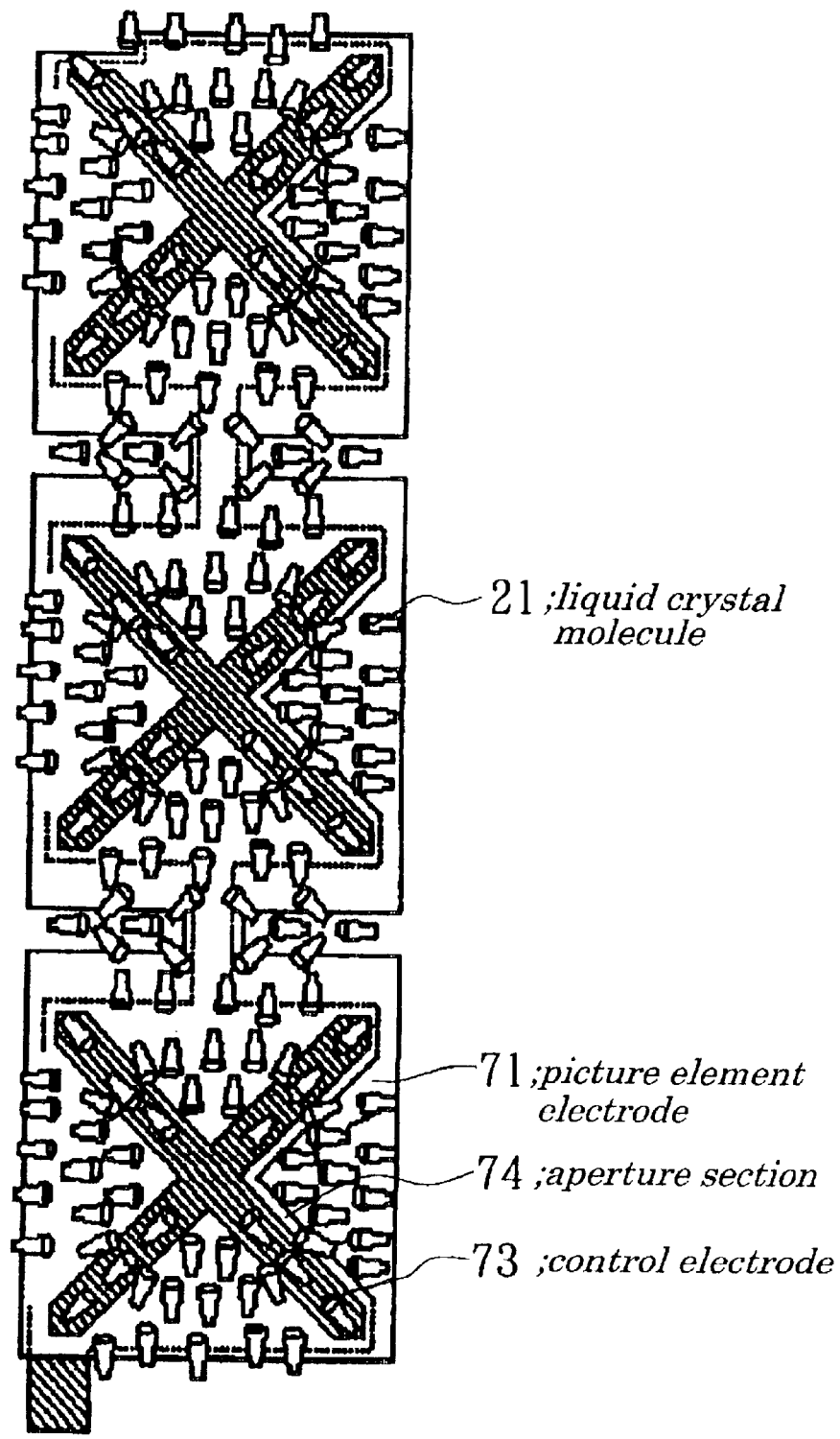
FIG. 11 is a schematic diagram showing a liquid crystal orientation in a multi-domain form in the multi-domain liquid crystal display device according to the second embodiment of the present invention.

FIG. 11 is a schematic diagram showing a liquid crystal orientation in a multi-domain form in the multi-domain liquid crystal display device according to the second embodiment of the present invention. It shows a liquid crystal orientation state at the aperture section 74 including the pixel electrode 71 and the control electrode 73 shown in FIG. 8. As shown in FIG. 11, the area is formed using the aperture section 74 of the pixel electrode 71 as a boundary where tilt direction of liquid crystal molecule 21 is not matched to each other. The orientation direction of the liquid crystal molecule 21 is changing continuously due to elasticity of the liquid crystal 20 at each boundary of the area.

According to the second embodiment, each of the polarizers is disposed outside the first substrate 11 and a second substrate 12 respectively. Various directional combinations of transmission axes of the polarizers existing on both sides of the first substrates 11 and second substrate 12 are possible. Especially, by having the transmission axes of the polarizers on both sides intersected at right angles and by having the tilt direction of the liquid crystal molecule 21 in main liquid crystal orientation areas matched to the direction in which the transmission axes of the polarizer intersected at right angles are divided into two parts, it is possible to achieve a displaying state having sharp contrast. Moreover, by inserting an optical compensating plate called a "negative compensating plate" having a refractive index within a face being larger than that in a direction of normal to a face, between the liquid crystal 20 and the polarizer, viewing angle characteristic occurring at a time of displaying the black color can be improved.

Figure 12:
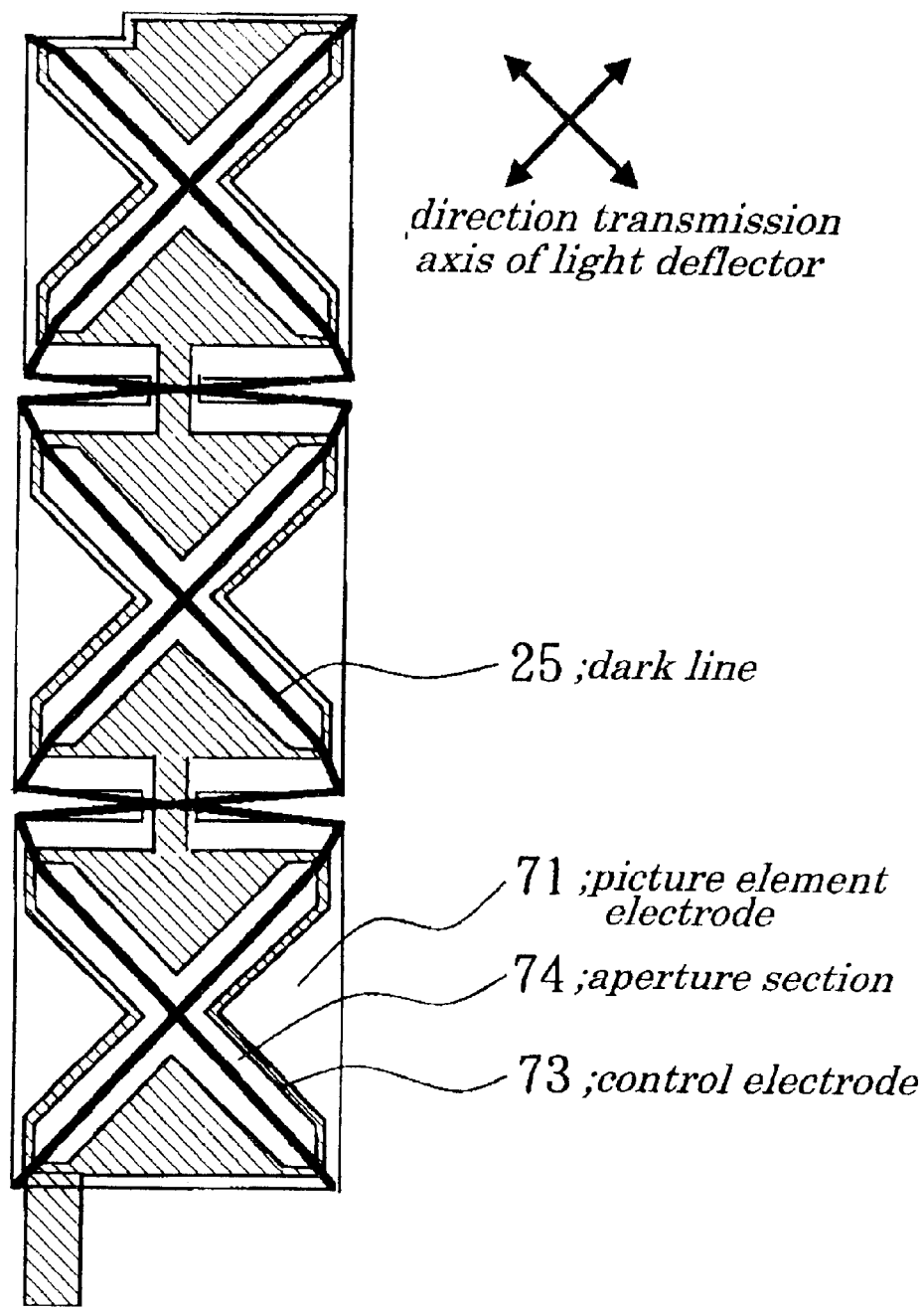
FIG. 12 is a schematic diagram showing a state of transmitted light corresponding to the liquid crystal orientation state in the multi-domain form in the multi-domain liquid crystal display device according to the second embodiment of the present invention.

FIG. 12 is a schematic diagram showing a state of transmitted light corresponding to the liquid crystal orientation state in the multi-domain form in the multi-domain liquid crystal display device according to the second embodiment and, as in the case of the first embodiment, it shows a state of the transmitted light at sections including the pixel electrode 71 and control electrode 73 in FIG. 8. Although the pixel electrode 71 and control electrode 73 are made of the transparent electrode, since the common capacitor line 72 is formed of opaque metal such as chromium or a like as described above, light is not transmitted actually in an area above the common capacitor line 72, however, to explain a relationship between the liquid crystal orientation state and the light transmission, light interception by the common capacitor line 72 is disregarded.

In FIG. 12, the polarizers are connected in a manner that their transmission axes are adapted to form diagonal lines. In this case, since the tilt direction of the liquid crystal molecule 21 is matched to a direction in which the transmission axes of the polarizers on both sides are divided into two parts, that is, to each of up/down and right/left directions in FIG. 12 at each of main liquid crystal orientation areas, although an excellent bright state can be displayed by applying the liquid crystal driving electric field E1, at a boundary area of each of the liquid crystal orientation areas, dark lines 25 as shown in FIG. 12 occur. These dark lines correspond to sections in which the tilt direction of the liquid crystal molecule 21 is matched to the direction of the transmission axis of the polarizer. In the direction of the transmission axis of the polarizer, even if the liquid crystal 20 is tilt toward such direction, since no light is transmitted, the dark lines 25 as shown in FIG. 12 occur.

The dark lines 25 described above do not present a serious problem in the displaying operation. However, when the black displaying state in which a voltage is not applied is changed to the bright displaying state in which voltage is applied, there is a case where a secondary change in the liquid crystal orientation in which the liquid crystal molecule 21 changes its tilt direction occurs following a temporary change in the liquid crystal orientation, that is, a change in which the liquid crystal 20 is tilt toward the direction defined by the electric field from the control electrode 73, which presents a problem. In this case, after the dark lines 25 occurs, a change in its shape and width appears. Secondary orientation of the liquid crystal 20 is changed slowly when compared with primary orientation and such slow changes in the secondary orientation cause a pixel light transmission rate change with time. There are two patterns, if classified roughly, in the pixel light transmission rate change with time. One is a change which causes a substantial delay in the change from the black state to the bright state, which leads to an after-image. Another is the change which causes the bright displaying state appeared once to gradually become the dark displaying state, which leads to insufficient brightness of the displaying in a steady state.

The problem of occurrence of the dark lines 25 can be solved by inserting an optically anisotropic medium called the "quarter-wave plate" between the polarizer and the liquid crystal 20 so that circularly polarized light is entered into the liquid crystal layer. In this embodiment, since the control electrode 73 includes transparent electrodes, disappearance of the dark line 25 directly leads to improvement of device transmission rate or response characteristics. The quarter-wave plate may include a single layer or stacked layers made of drawn films such as polycarbonate or a like and can be disposed on both sides of the liquid crystal layer in a manner that its optic axes are intersected at right angles. If a "wide-band quarter-wave plate" constructed of stacked layers including a plurality of pieces of drawn films is used, it can be disposed on both sides of the liquid crystal layer in a manner that corresponding layers are intersected at right angles.

Moreover, in ordinary driving operations of the liquid crystal, even if change occurs in the transmission rate in which the displaying state becomes gradually dark after it is made bright once, when driving is performed to insert the black displaying state for every frame of the displaying in order to make an image sharp at a time of displaying a moving picture, there is no problem of this kind of change with time.

In this second embodiment, operations of the liquid crystal 20 are same as in the case of the first embodiment. In this case, in the case of a homogenous mode in particular, if a compensating film having negative refractive index anisotropy (having a small refractive index of the optic axis) is used in a normal black mode in which its optic axis conforms to an optic axis of the liquid crystal at a time of no application of voltage, a good viewing angle characteristic can be obtained. At this point, it is desirable that each of the retardation of the compensating film and the liquid crystal layer has a reverse code and a same absolute value. Moreover, it is possible to improve display contrast and viewing angle characteristics by using biaxial compensating films.

A method of producing the multi-domain liquid crystal display device of the second embodiment can be executed in conformance with that of the first embodiment described by referring to FIGS. 6A, 6B and 7A, 7B. That is, according to the second embodiment, in FIG. 6A, the control electrode 73 is formed instead of the pixel electrode 71 and, in FIG. 7A, the pixel electrode 71 is formed instead of the control electrode 73. Moreover, the aperture section 74 is also formed at time of patterning on the pixel electrode 71. A top view showing each component of the multi-domain liquid crystal display device manufactured in accordance with the method of this second embodiment is shown in FIG. 6A and FIG. 6B and the pixel is about 100·m across×about 300·m down in size. The top view of each component is not limited to that shown in FIG. 6A and FIG. 6B and a variety of configurations are available, for example, as shown in FIG. 20A to FIG. 20H.

Thus, in the second embodiment, almost same effects as in a case of the first embodiment can be obtained.

Third Embodiment

Figure 13:
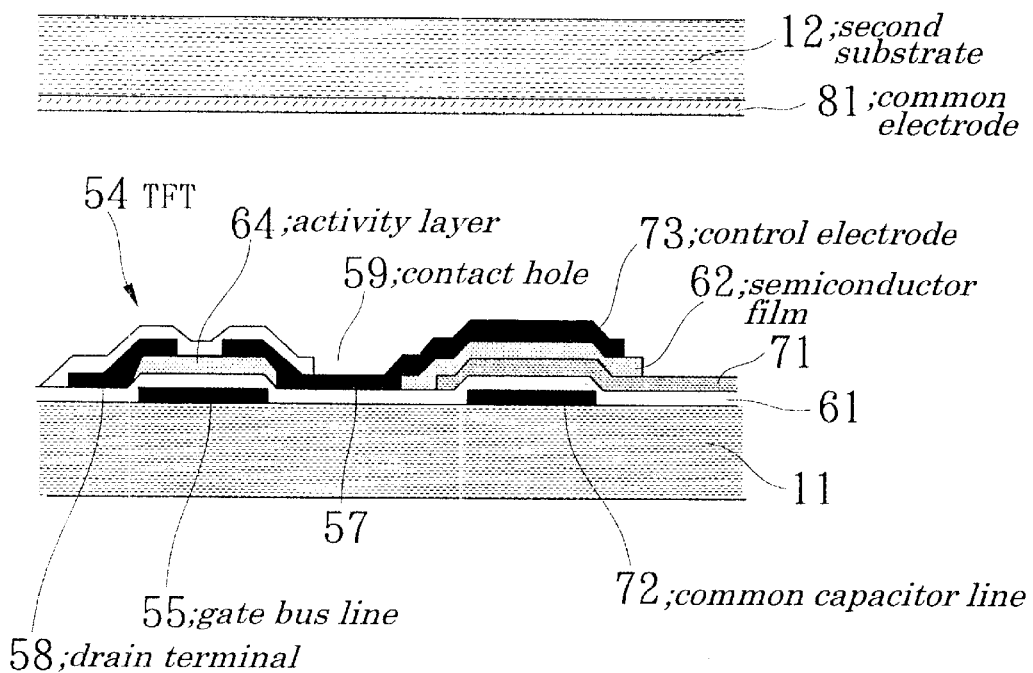
FIG. 13 is a schematic partial cross-sectional view showing configurations of a multi-domain liquid crystal display device according to a third embodiment of the present invention.
Figure 14:
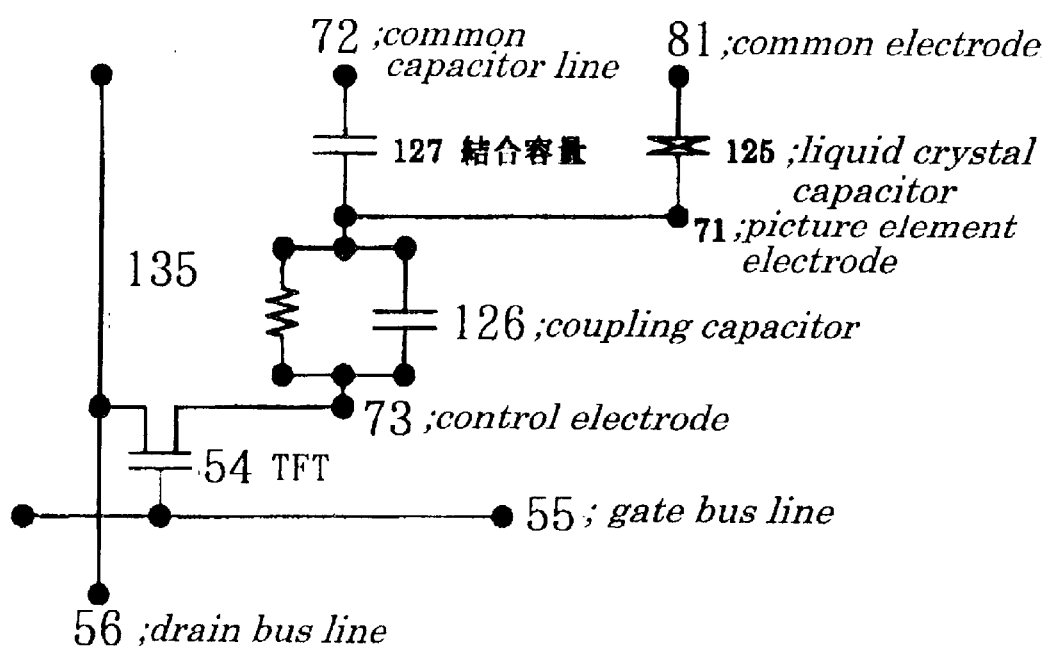
FIG. 14 is an equivalent circuit of a pixel employed in the multi-domain liquid crystal display device according to the third embodiment of the present invention.

FIG. 13 is a schematic partial cross-sectional view showing configurations of a multi-domain liquid crystal display device according to a third embodiment of the present invention (corresponding to FIG. 2 in the first embodiment). FIG. 14 is an equivalent circuit of a pixel of the multi-domain liquid crystal display device according to the third embodiment. The configurations of the multi-domain liquid crystal display device of this embodiment differ greatly from those in the first embodiment in that the pixel electrode is not fully in the floating state. That is, in the multi-domain liquid crystal display device of this embodiment, as shown in FIGS. 13 and 14, in order to prevent an electric charge from being accumulated in the pixel electrode 71 due to some reasons, for example, an interlayer dielectric 63 composed of a semiconductor layer made of amorphous silicon or a like is formed, instead of the insulating layer as provided in the first embodiment, so that a coupling resistor 135 having a substantially finite resistance value is connected between the pixel electrode 71 and the control electrode 73, in parallel to the coupling capacitor 126. Then, by doping the semiconductor with appropriate impurity ion, a desired resistance value can be obtained.

Similarly, instead of the gate insulating film 61 between the common capacitor line 72 and the pixel electrode 71, in the same manner as described above, by forming the interlayer dielectric 63 composed of a semiconductor layer made of amorphous silicon or a like, a coupling resistor 135 having a finite resistance value may be connected. The resistance value of the coupling resistor 135 is set to a value which can cause the accumulated electric charge to be discharged in order to prevent the display being burnt due to the electric charge accumulated at the pixel electrode 71 or to prevent the after-image continuing for a period exceeding a response time of the liquid crystal from being generated at a time of displaying a moving image. Depending upon the use environment of the liquid crystal display device, the discharging can be complete within a period of displaying one frame or by a quiescent operation for a period of several seconds to several minutes.

Except those described above, configurations of the pixel in the third embodiment as shown in FIGS. 13 and 14 are the same as those in the first embodiment as shown in FIGS. 1 to 5 and therefore the same reference numbers in FIGS. 13 and 14 designate corresponding parts in FIGS. 1 to 5 and their descriptions are omitted accordingly.

A method of producing the multi-domain liquid crystal display device of the third embodiment is executed in conformance with that of the first embodiment described by referring to FIGS. 6A, 6B and 7A, 7B. That is, according to the third embodiment, the interlayer dielectric 63 can be formed by patterning so as to have a desired shape at the same time when, after the amorphous silicon film was formed on the whole surface by the CVD method, the activity layer 64 was formed by patterning on the amorphous silicon using the photolithography technology to have a desired shape, in the processes shown in FIG. 6B and FIG. 7A.

Figure 15:
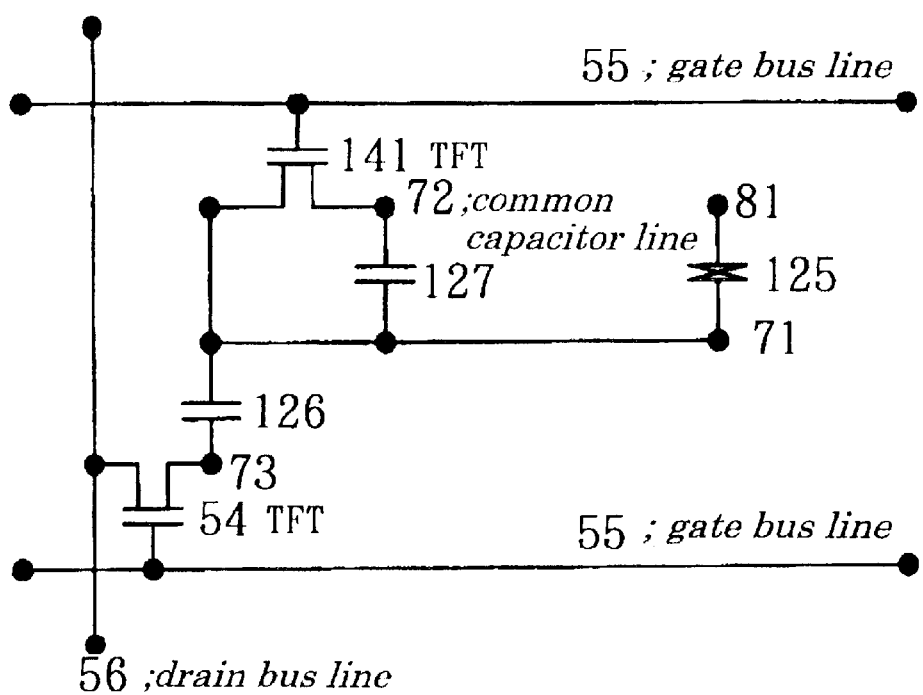
FIG. 15 is an equivalent circuit of a pixel of a modified example of the multi-domain liquid crystal display device of the third embodiment.

FIG. 15 is an equivalent circuit of a pixel of a modified example of the multi-domain liquid crystal display device of the third embodiment. The modified multi-domain crystal display is so configured that the TFT 141 is formed to establish a connection between each of the pixel electrodes 71 and the common capacitor line 72, and the gate of the TFT 141 is connected to a gate bus line 55 on a front stage and that the electric charge accumulated at the pixel electrode 71 is discharged by a potential held on the pixel electrode 71 of the common capacitor line 72 the instant at which the gate bus line 55 on the front stage is selected.

Thus, in the third embodiment, almost the same effects as in the case of the first embodiment can be obtained as well.

Fourth Embodiment

Figure 16:
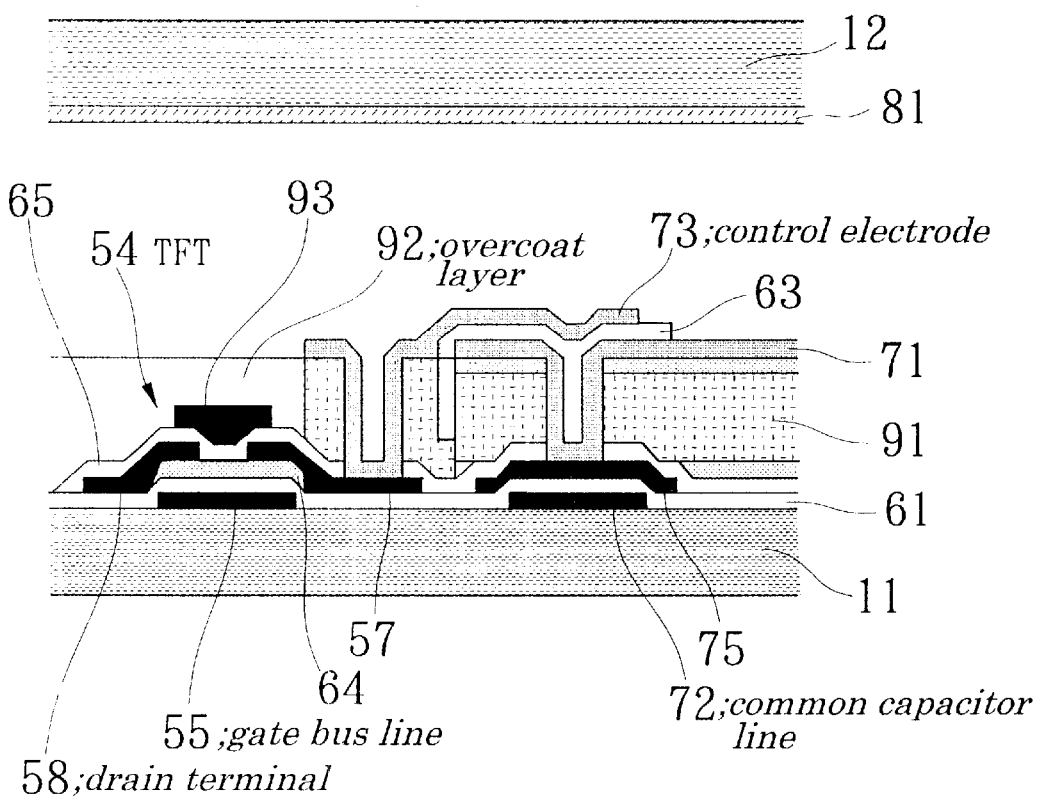
FIG. 16 is a schematic partial cross-sectional view of configurations of a multi-domain liquid crystal display device according to a fourth embodiment of the present invention.

FIG. 16 is a schematic partial cross-sectional view of configurations of a multi-domain liquid crystal display device according to a fourth embodiment of the present invention (corresponding to FIG. 2 of the first embodiment). The configurations of the multi-domain liquid crystal display device of this embodiment differ greatly from those in the first embodiment in that the pixel electrode and the control electrode are formed above a color layer and a light blocking layer. That is, in the multi-domain liquid crystal display device of this embodiment, the color layer 91 and the light blocking layer 93 are formed on the first substrate 11 and the pixel electrode 71 and control electrode 73 are formed above the color layer 91 and the light blocking layer 93, and the pixel electrode 71 is disposed to be opposed to the common capacity line 72 through the capacitor terminal 75. Except those described above, configurations of the pixel in the fourth embodiment as shown in FIG. 16 are the same as those in the first embodiment as shown in FIGS. 1 to 5 and therefore the same reference numbers in FIG. 16 designate corresponding parts in FIGS. 1 to 5 and their descriptions are omitted accordingly.

A method of producing the multi-domain liquid crystal display device of the fourth embodiment is executed in conformance with that of the first embodiment described by referring to FIGS. 6A, 6B and 7A, 7B. That is, according to the fourth embodiment, after the activity layer 64 was formed and a chromium film was formed on the whole surface by sputtering and then the drain bus line 56, the drain terminal 58 and the source terminal 57 were formed by patterning on the chromium film by using the photolithography technology to have a desired shape and at the same time the capacitor terminal 75 was formed. Moreover, the passivation film 65, made of silicon nitride, of the TFT 54 was formed and the light blocking layer 93 was formed by using a black resist and the color layer 91 composed of the R (red), G (green) and B (blue) colors by using the color resist. Then, an over coat layer 92 was formed and planarized, on which the pixel electrode 71, semiconductor film 62 and control electrode 73 were formed. The control electrode 73 was connected to the source terminal 57 through the contact hole and the pixel electrode 71 was connected to the capacitor terminal 75 through the contact hole. The pixel electrode 73 was in the floating state while being connected to the capacitor terminal 75.

By using the interlayer dielectric 63 composed of semiconductor films as the semiconductor film 62 disposed between the pixel electrode 71 and control electrode 73, it is possible that the pixel electrode 71 is not fully in the floating state.

Thus, in the fourth embodiment, almost the same effects as in the case of the first embodiment can be obtained as well.

Fifth Embodiment

Figure 17:
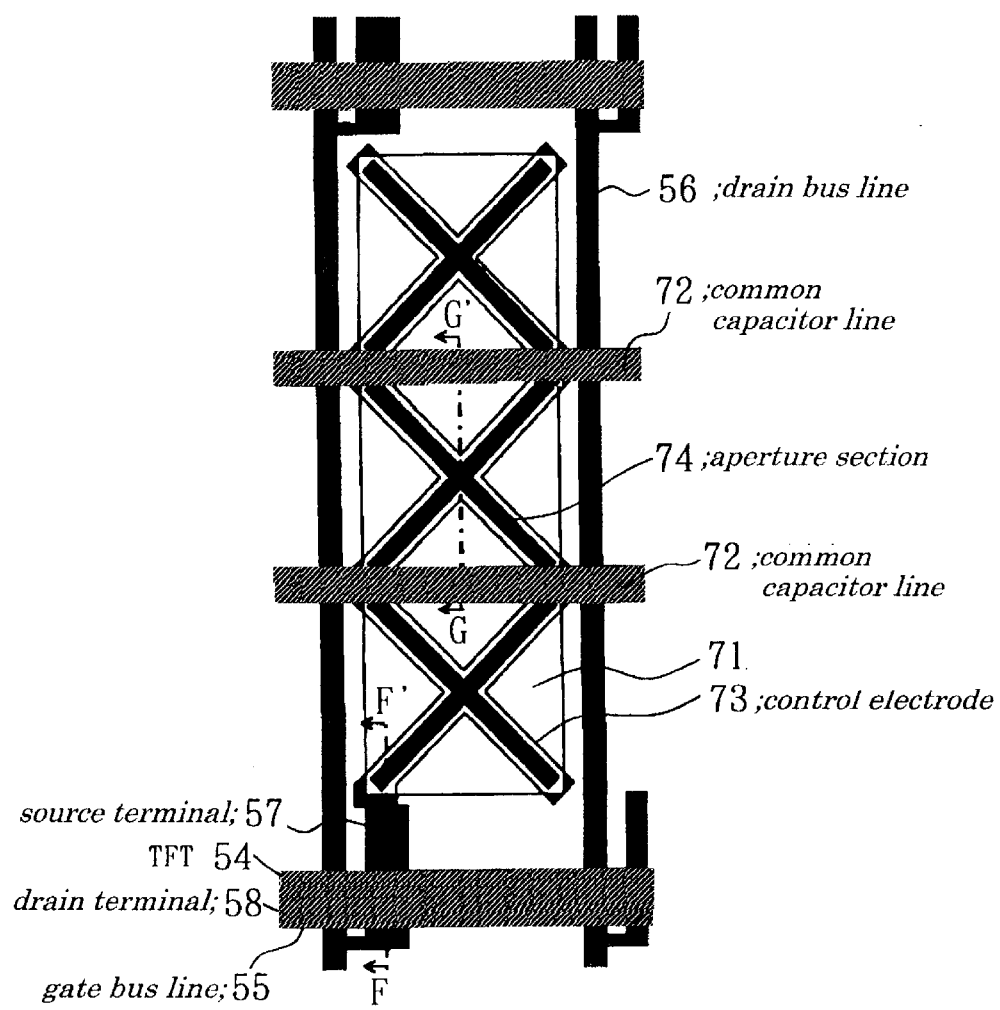
FIG. 17 is a schematic top view of configurations of a pixel of a multi-domain liquid crystal display device according to a fifth embodiment of the present invention.
Figure 18:
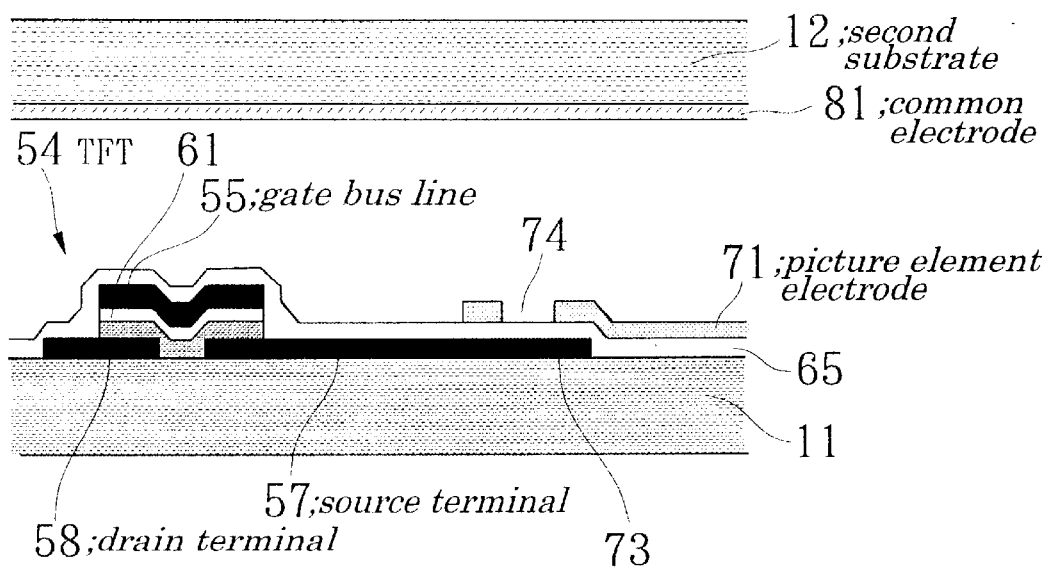
FIG. 18 is a schematic partial cross-sectional view of the pixel of the multi-domain liquid crystal display device of FIG. 17 taken along the line F–F'.
Figure 19:
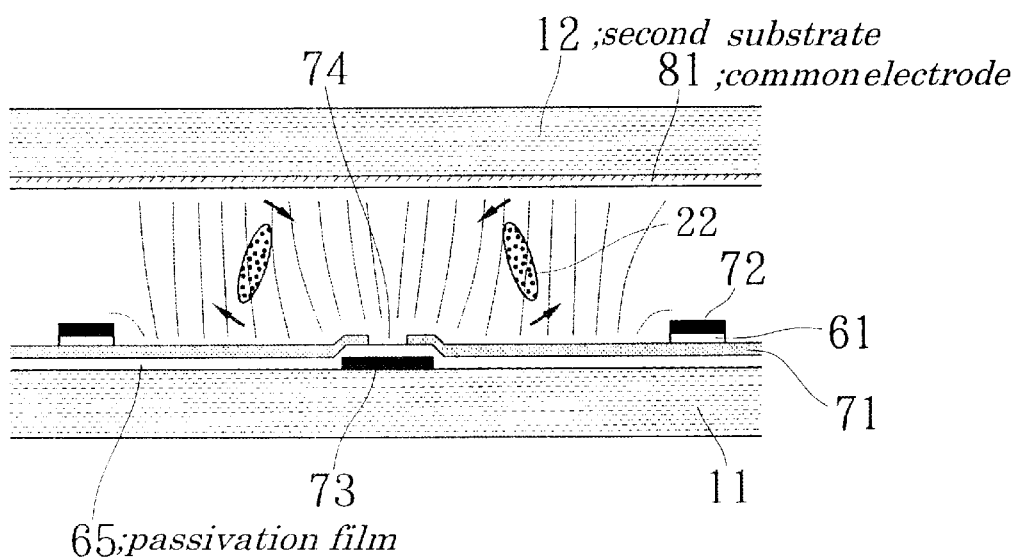
FIG. 19 is a schematic partial cross-sectional view of the pixel employed in the multi-domain liquid crystal display device of FIG. 17 taken along the line G–G'.

FIG. 17 is a schematic top view of configurations of a pixel of a multi-domain liquid crystal display device according to a fifth embodiment of the present invention. FIG. 18 is a schematic partial cross-sectional view of the pixel of the multi-domain liquid crystal display device of FIG. 17 taken along the line F–F'. FIG. 19 is a schematic partial cross-sectional view of the pixel of the multi-domain liquid crystal display device of FIG. 17 taken along the line G–G'. The configurations of the multi-domain liquid crystal display device of this embodiment differ greatly from those in the first embodiment in that the TFT serving as the switching device is constructed so as to have a top gate structure. That is, in the multi-domain liquid crystal display device of this embodiment, the TFT 54 is constructed so as to be of the top gate structure in which the gate bus line 55 is disposed above the source terminal 57 and drain terminal 58. Except those described above, configurations of the pixel in the fifth embodiment as shown in FIG. 17 are the same as those in the first embodiment as shown in FIGS. 1 to 5 and therefore the same reference numbers in FIG. 17 designate corresponding parts in FIGS. 1 to 5 and their descriptions are omitted accordingly.

A method of producing the multi-domain liquid crystal display device of the fifth embodiment is executed in conformance with that of the first embodiment described by referring to FIGS. 6A, 6B and 7A, 7B. That is, according to the fifth embodiment, a chromium film was formed on the first substrate 11 and, at the same time, the drain bus line 56, drain terminal 58, source terminal 57 and control electrode 73 was formed, and then an amorphous silicon layer, insulating layer and chromium sputtered film was formed, on the whole of which patterning was performed to form the TFT 54. Moreover, the pixel electrode 71 was in the floating state. The control electrode 73 is provided with the aperture section 74. Then, silicon oxide films and ITO films were formed continuously by sputtering and the gate insulating film 61 and common capacitor line 72 were formed by patterning on the whole surface of these films.

According to this embodiment, the almost same multi-domain fluid crystal display device as provided in the second embodiment shown in FIG. 10 can be obtained, except that the TFT 54 is of the top gate structure, not of the bottom gate structure.

Moreover, by using the interlayer dielectric 63 composed of semiconductor films instead of the semiconductor film 62 disposed between the pixel electrode 71 and the control electrode 73 or instead of the gate insulating film 61 disposed between the pixel electrode 71 and the common capacitor line 72, it is possible that the picture electrode 71 is not in the floating state as in the third embodiment.

Thus, in the fifth embodiment, almost the same effects as in the case of the first embodiment can be obtained as well.

Sixth Embodiment

FIGS. 20A to 20H are top views showing each of combinations of the pixel electrode with the control electrode of the multi-domain liquid crystal display device according to a sixth embodiment of the present invention. FIGS. 21A to 21F are top views of basic configurations of examples of each of combinations of the pixel electrode with the control electrode of the multi-domain liquid crystal display device according to the sixth embodiment. FIGS. 22A to 22D are also top views of showing each of combinations of the pixel electrode with the control electrode of the multi-domain liquid crystal display device according to the sixth embodiment. FIGS. 23A to 23G are top views of application examples in which the above combinations of the pixel electrode with the control electrode are applied to the multi-domain liquid crystal display device according to the sixth embodiment.

As shown in FIGS. 20A to 20H, various combinations of the pixel electrode 71 with the control electrode 73 of the multi-domain liquid crystal display device of this embodiment are possible. The top views shown in FIGS. 21A to 21F, FIGS. 22A to 22D and FIGS. 23A to 23G show diagrams in which the pixel electrode 71 and control electrode 73 are projected on each of planar faces. In the case of the control electrode 73 in particular, the diagrams show only sections which can be seen from the aperture section 74 mounted on the pixel electrode 71.

In these examples, a positional relationship among the aperture section 74 disposed on the control electrode 73 and pixel electrode 71 and end portions of the pixel electrode 71 is important. The positional relationship will be described below by referring the above top views.

First, examples of a basic combination (hereafter referred to as a "unit electrode") of the pixel electrode 71 with the control electrode 73 and of the end portion of the pixel electrode 71 are described by referring to FIGS. 22A to 22F and then each of the application examples in which the unit electrode is applied to the liquid crystal display device is described by referring to FIGS. 23A to 23G. The description therein is given assuming that the pixel electrode 71 and control electrode 73 were on a same planar surface. In the multi-domain fluid crystal display device, however, each of the pixel electrode 71 and control electrode 73 is in a different planar surface actually. Moreover, if electrical continuity is secured by passing a current through the contact hole or a like, a part or a whole of the pixel electrode 71 and control electrode 73 may be constructed to be on the same planar surface.

Figure 21A:
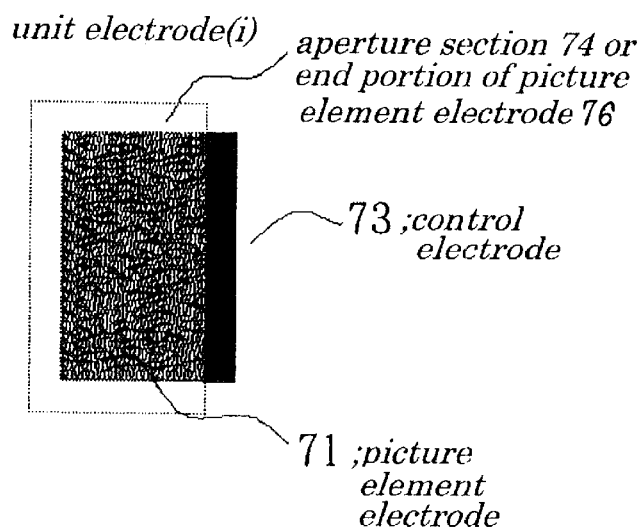
FIGS. 21A to 21F are top views of basic configurations of examples of combinations of the pixel electrode with the control electrode of the multi-domain liquid crystal display device according to a sixth embodiment of the present invention.

In the unit electrode (i) shown in FIG. 21A, the pixel electrode 71 is square in shape and the control electrode 73 is disposed along one side of the square and the remaining three sides of the square constitute a part of the aperture section 74 or the pixel electrode end section 76.

Figure 21B:
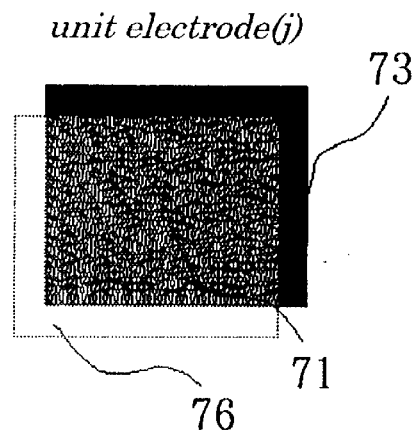

In the unit electrode (j) shown in FIG. 21B, the pixel electrode 71 is square in shape and the control electrode 73 is disposed along two sides of the square and the remaining two sides of the square constitute a part of the aperture section 74 or the pixel electrode end section 76.

Figure 21C:
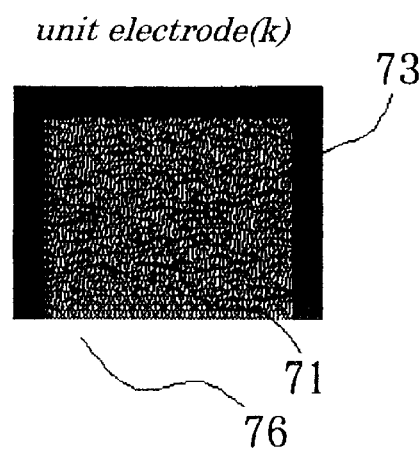

In the unit electrode (k) shown in FIG. 21C, the pixel electrode 71 is square in shape and the control electrode 73 is disposed along three sides of the square and the remaining one side of the square constitutes a part of the aperture section 74 or the pixel electrode end section 76.

Figure 21D:
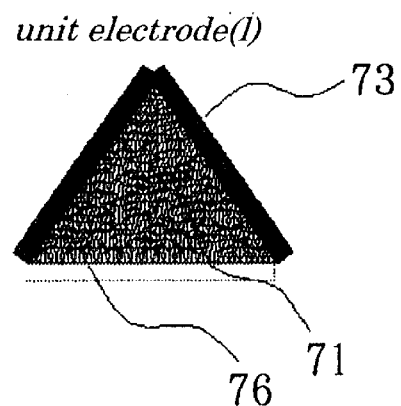

In the unit electrode (l) shown in FIG. 21D, the pixel electrode 71 is triangular in shape and the control electrode 73 is disposed along two sides of the triangle and the remaining one side of the square constitutes a part of the aperture section 74 or the pixel electrode end portion 76.

Figure 21E:
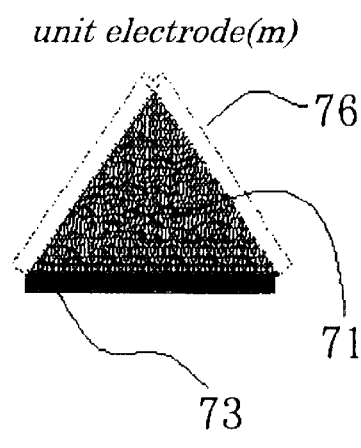

In the unit electrode (m) shown in FIG. 21E, the pixel electrode 71 is triangular in shape and the control electrode 73 is disposed along one side of the triangle and the remaining two sides of the triangle constitute a part of the aperture section 74 or the pixel electrode end section 76.

Figure 21F:
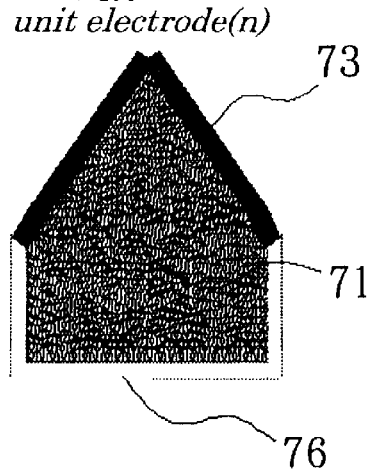

In the unit electrode (n) shown in FIG. 21F, the pixel electrode 71 is pentagonal in shape and the control electrode 73 is disposed along two sides of the pentagonal shape and the remaining three sides of the pentagon constitute a part of the aperture section 74 or the pixel electrode end section 76.

Next, examples in which the unit electrodes (i) to (n) shown in FIGS. 21A to 21F are actually applied to the multi-domain liquid crystal display device being about 100·m across×300·m down in size will be described by referring to FIGS. 23A to 23G.

Figure 22A:
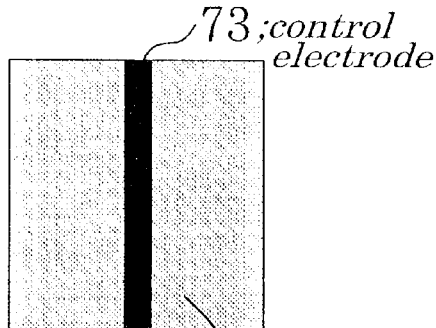
FIGS. 22A to 22D are top views of basic configurations of examples of combinations of the pixel electrode with the control electrode of the multi-domain liquid crystal display device according to the sixth embodiment of the present invention.

In the application example (s) shown in FIG. 23A, several unit electrodes shown in FIG. 21A are employed. That is, the unit electrode (i) shown in FIG. 21A and the unit electrode (i) also shown in FIG. 21A are disposed in a manner that they are symmetrical to a line of the control electrode 73 to form an electrode (o) shown in FIG. 22A in which the control electrode 73 is adapted to be used in common and two of the electrode (o) shown in FIG. 22A constitute one pixel electrode of the multi-domain liquid crystal display device. The reason why the electrode (o) as shown in FIG. 22A is formed is that the direction of the liquid crystal can be controlled in approximately two directions by the skew electric field produced by the control electrode 73 and by the skew electric field produced at the end section in the right/left areas of the electrode (o) shown in FIG. 22A. In the application example (s) shown in FIG. 23A, the control electrode 73 is adapted to be parallel to a long side of the pixel electrode 71. Moreover, in the application example (s) of the electrodes (o) to the multi-domain liquid crystal display device, a junction section is provided so that the pixel electrodes 71 are not divided by the control electrode 73 and all of the pixel electrodes 71 on one pixel are at a same potential. Moreover, in all the cases in which the electrode (o) shown in FIG. 22A is employed in the application example (t) shown in FIG. 23B, the unit electrode (l) shown in FIG. 21D is employed in the application example (u) shown in FIG. 23C, the unit electrode (j) shown in FIG. 21B is employed in the application example (w) shown in FIG. 23E, both the unit electrode (k) shown in FIG. 21C and the unit electrode (n) shown in FIG. 21F are employed in the application example (x) shown in FIG. 23F and all the unit electrode (i) shown in FIG. 21A, the unit electrode (l) shown in FIG. 21D and the unit electrode (j) shown in FIG. 21B are employed in the application example (y) shown in FIG. 23G, the junction section is provided so that all the pixel electrodes 71 are at the same potential.

In the application example (t) shown in FIG. 23B, five of the electrode (o) shown in FIG. 22A are placed in a manner that the control electrode 73 is parallel to a short side of the pixel and are used as one pixel electrode 71 of the multi-domain fluid crystal display device.

Figure 22B:
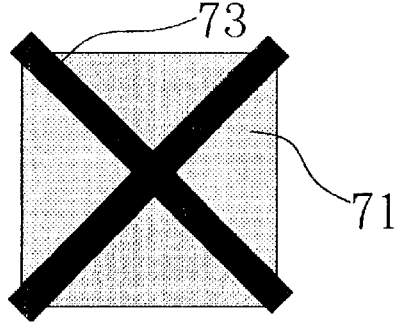

In the application example (u) shown in FIG. 23C, the unit electrodes (l) shown in FIG. 21D are used. First, four unit electrodes (l) shown in FIG. 21D are formed in a manner that they can use the control electrode 73 in common to form an electrode like an electrode (p) shown in FIG. 22B and two electrodes (p) are used as one pixel electrode 71 of the multi-domain liquid crystal display device. The reason why the unit electrode (l) shown in FIG. 21D and the electrode (p) shown in FIG. 22B are used is that the orientation of the liquid crystal above the unit electrode (l) can be controlled by three kinds of skew electric fields including skew electric fields generated by two control electrodes 73 and skew electric field from the end section of the pixel electrode 71 and further the orientation of the liquid crystal can be controlled approximately in four directions by placing the unit electrode (l) so as to have a configuration like the electrode (p).

Figure 22C:
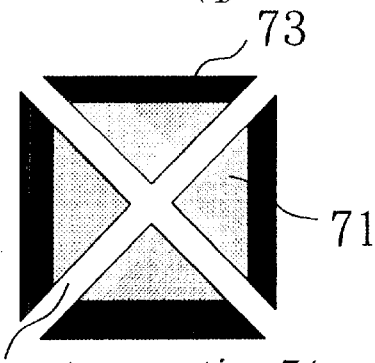

In the application example (v) shown in FIG. 23D, the unit electrode (l) shown in FIG. 21D and the unit electrode (m) shown in FIG. 21E are used. Four of the unit electrode (m) are disposed in a manner that the control electrode 73 are placed outside and an electrode having a shape like the electrode (q) shown in FIG. 22C is formed. The electrode (q) is placed between two electrodes (p) to form one pixel electrode of the multi-domain liquid crystal display device. However, in the application example (v) shown in FIG. 23D, in order to achieve a matching in the orientation of the liquid crystal between the electrode (p) and the electrode (q), a section contacting with the electrode (p) of the control electrode 73 existing outside of the electrode (q) has been removed. Thus, basically, the pixel electrode is formed by using the unit electrodes (i) to (n). However, as described above, to achieve the matching in the orientation of the liquid crystal, the shape of the unit electrode can be partially changed.

In the application example (w) shown in FIG. 23E, the unit electrode (j) shown in FIG. 21B is used. The unit electrode is made approximately quadrate and the four quadrate unit electrodes (j) are disposed in a manner that they can use the control electrode 73 in common to form an electrode having a configuration like the electrode (r) shown in FIG. 22D. Three pieces of the electrodes (r) are used as one pixel electrode of the multi-domain liquid crystal display device.

Figure 22D:
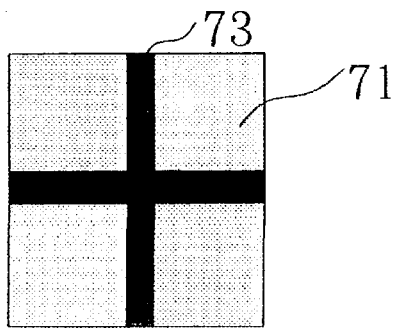
Figure 24:
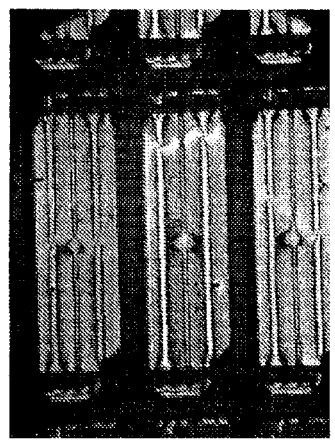
FIG. 24 is a microscopic photo showing an orientation state of a pixel employed in the multi-domain liquid crystal display device according to the sixth embodiment of the present invention.
Figure 25:
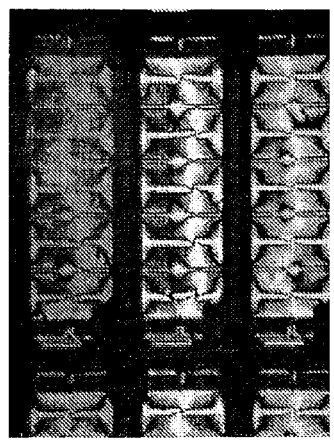
FIG. 25 is a microscopic photo showing the orientation state of the pixel employed in the multi-domain liquid crystal display device according to the sixth embodiment.
Figure 26:
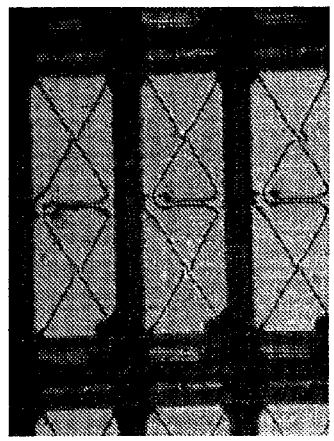
FIG. 26 is a microscopic photo showing the orientation state of the pixel employed in the multi-domain liquid crystal display device according to the sixth embodiment.
Figure 27:
FIG. 27 is a microscopic photo showing the orientation state of the pixel employed in the multi-domain liquid crystal display device according to the sixth embodiment.

The reason why the unit electrode (j) shown in FIG. 21B and the electrode (r) shown in FIG. 22D are used is that the orientation of the liquid crystal formed above the electrode (r) is controlled approximately in one direction by four kinds of skew electric fields including the skew electric field from two control electrodes 73 of the unit electrode (j) and the skew electric field from two pixel end section and the orientation of the liquid crystal can be controlled in approximately four directions by disposing the unit electrode (j) so as to have a configuration like the electrode (r). In the application example (w) shown in FIG. 23E, although the number of the electrodes (r) is 3, the present invention is not limited to the number and the number of the electrode (r) can be set to an arbitrary number depending on the pixel size and the application.

In the application example (x) shown in FIG. 23F, two unit electrodes (k) shown in FIG. 21C and two unit electrodes (n) shown in FIG. 21F are used. The shape of the unit electrode (k) is a trapezoid. The control electrode 73 is disposed on an upper base of the trapezoid and the upper base is used in common by two unit electrodes (k). The unit electrode (n) shown in FIG. 21F is disposed on an oblique line section so that the control electrode 73 can be used in common by the unit electrode (n) and the unit electrode (k). When they are combined to form an electrode, in order to achieve a matching in the orientation of the liquid crystal, a part of the upper base of the trapezoid, i.e., a part of the control electrode is hidden. As a result, an electrode is formed which is seen as if two Y-type control electrodes 73 were inverted up and down on a rectangular pixel electrode 71 and the resulting electrode is used as one pixel electrode of the multi-domain liquid crystal display device.

In the application example (y) shown in FIG. 23G, three types of the unit electrodes including the unit electrode (i), unit electrode (l) and unit electrode (j) are used. In this example, the unit electrode (i) is trapezoidal, the unit electrode (l) is right-angled equilaterally triangular having a angle surrounded by the control electrode 73 is rectangular and the unit electrode (j) is parallelogrammatic. The oblique line of the unit electrode (l) contacts the upper base (serving as an aperture section) of the unit electrode (i), and the lower base of the unit electrode (i) and the unit electrode (j) use the control electrode 73 in common. Several electrodes thus fabricated are used as one pixel electrode of the multi-domain liquid crystal display device. Moreover, since a part of the minute pixel electrode is right-angled equilaterally triangular, the control electrode 73 and the aperture section 74 form an angle of about 45° or about 135° to a short side of the pixel.

In any one of the application examples (s) to (y), although the pixel electrode 71 is formed basically by using the unit electrode, in order to achieve the matching in the orientation of the liquid crystal for a whole of the pixel, the shape of the unit electrode can be partially changed.

Then, the multi-domain liquid crystal display device having the pixel electrodes 71 fabricated as above was manufactured. The operations of the control electrode 73 of this embodiment are executed in conformance with those of the second embodiment.

Figure 28:
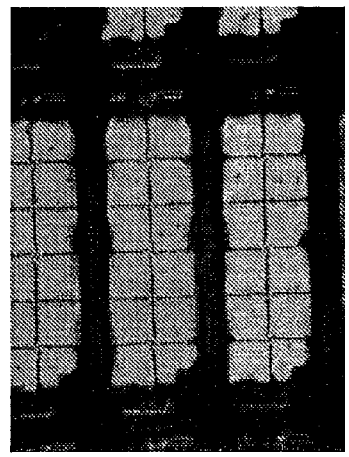
FIG. 28 is a microscopic photo showing the orientation state of the pixel employed in the multi-domain liquid crystal display device according to the sixth embodiment.
Figure 29:
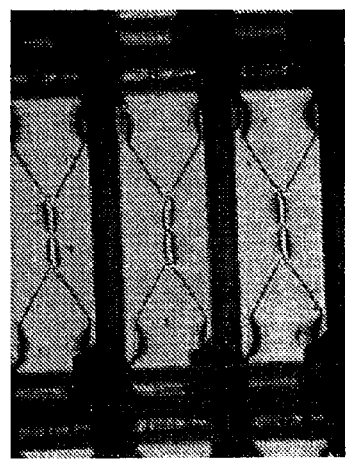
FIG. 29 is a microscopic photo showing the orientation state of the pixel employed in the multi-domain liquid crystal display device according to the sixth embodiment.
Figure 30:
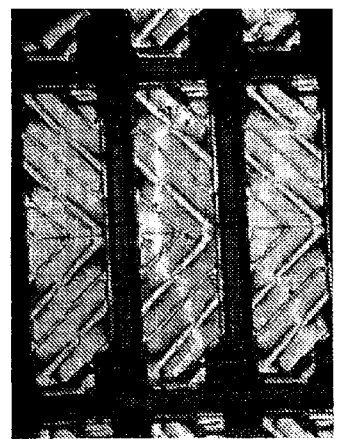
FIG. 30 is a microscopic photo showing the orientation state of the pixel employed in the multi-domain liquid crystal display device according to the sixth embodiment.
Figure 31:
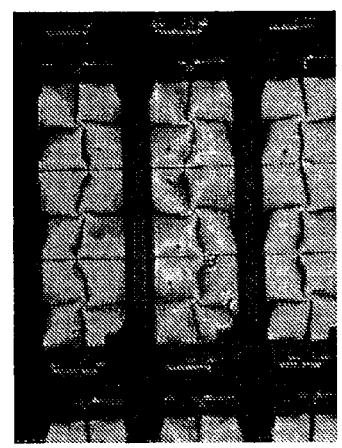
FIG. 31 is a microscopic photo of a pixel at a time of displaying in a multi-domain liquid crystal display device according to a seventh embodiment of the present invention.
Figure 32:
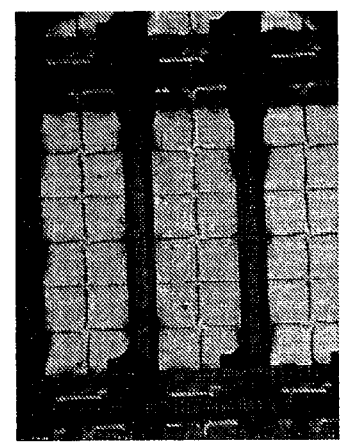
FIG. 32 is a microscopic photo of the pixel at the time of displaying in the multi-domain liquid crystal display device according to the seventh embodiment.
Figure 33:
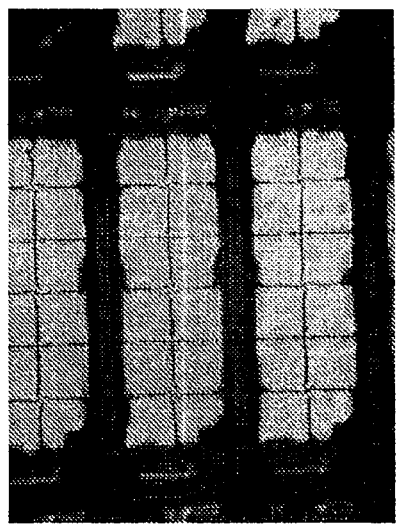
FIG. 33 is a microscopic photo of the pixel at the time of displaying in the multi-domain liquid crystal display device according to the seventh embodiment.
Figure 34:
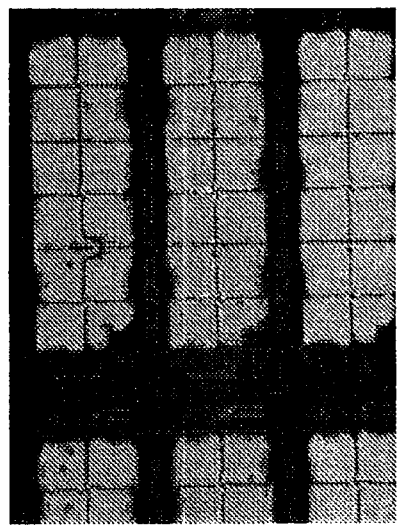
FIG. 34 is a microscopic photo of the pixel at the time of displaying in the multi-domain liquid crystal display device according to the seventh embodiment.

FIGS. 24 to 30 are microscopic photos showing the orientation state occurring in the application examples (s) to (y) described above. Moreover, in FIGS. 24 to 27 and FIG. 29, two pieces of polarizers are disposed in a manner that absorption axes of the polarizers are intersected at right angles and that one of the absorption axes of the polarizer forms an angle of about 45° to a long side of the pixel. In FIGS. 28 and 30, absorption axes of two polarizers are intersected at right angles and one of the absorption axes of the polarizer forms an angle of about 0° to a long side of the pixel.

According to this embodiment, in any one of the application examples (s) to (y), by the effects of the skew electric fields from areas surrounding the control electrode, aperture section 74 and pixel electrode 71, an excellent multi-domain liquid crystal orientation was obtained. Especially, in the application example (w) shown in FIG. 23E, good viewing angle characteristic and the orientation having high transmission rate and excellent stability were obtained. In this example, since the shape of the unit electrode (j) is almost quadrate, the liquid crystals fall toward diagonal lines. This causes the direction of the orientation to be deviated by about 90° between unit electrodes (j) being adjacent to each other. The orientation of the liquid crystal above the electrode (r) is divided by a "+" type control electrode 73 to be fourfold symmetrical.

Thus, in the sixth embodiment, almost the same effects as in the case of the first embodiment can be obtained as well.

Seventh Embodiment

In a seventh embodiment of the present invention, influences on liquid crystal orientation controllability caused by a different control electrode voltage coefficient (control electrode voltage/pixel electrode voltage) in the application example (w) shown in FIG. 23E were investigated. The pixel electrode voltage and the control electrode voltage represent a voltage of the pixel electrode 71 relative to a voltage of the common electrode 81 and a voltage of the control electrode 73 relative to a voltage of the common electrode 81 respectively.

As described above, the ratio of the voltage between the picture electrode voltage and the control electrode voltage is defined by a ratio among the coupling capacity 126 between the picture electrode 71 and control electrode 73, the coupling capacity 127 between the pixel electrode 71 and common capacitor line 72 and the liquid crystal capacitor 125. Here, if the voltage of the common capacitor line 72 is the same as that of the common electrode 81, the following equation is given.

(control electrode voltage coefficient)=[(capacitance value of liquid crystal capacitor 125)+(capacitance of coupling capacitor 126)+(capacitance of coupling capacitor 1279)]/(capacitance of coupling capacitor 126)

Though the capacitance of the liquid crystal capacity 125 varies depending on changes of the orientation state, for simplicity, it is presumed that the capacitance of the liquid crystal capacitor 125 is maximum. That is, when the capacitance of the liquid crystal capacitor is calculated, a larger dielectric constant out of the dielectric constants corresponding to a direction horizontal to the liquid crystal molecule axis and corresponding to a direction vertical to the liquid crystal molecule axis is used. In the example, the control electrode coefficient is made different by changing the capacitance of the coupling capacitor 126. Since the coupling capacitor 126 is formed at the portion overlain by the pixel electrode 71 and the control electrode 73, the capacitance of the coupling capacitor 126 is defined by the overlying portion, thickness of the interlayer film between the pixel electrode 71 and the control electrode 73 and by the dielectric constant. In the example, a case is shown where the overlying portion between the control electrode 73 and the pixel electrode 71 is changed as shown in Table 1. The interlayer film between the both electrodes 71 and 73 was formed by the CVD method using silicon nitride and its thickness was about 20 nm. The dielectric constant of the silicon nitride was about 6.4.

TABLE 1

Relationship between area at overlying portion and control electrode voltage coefficient

| Area at overlying portion [· $m^2$] | Coupling capacitor 126 [fF] · | Coupling capacitor 127 [fF] · | Liquid crystal capacitor 125 [fF] · | Control electrode voltage coefficient (·+·+·/ ·) |
| --- | --- | --- | --- | --- |
| 16800 | 4763 | 164 | 312 | 1.1 |
| 8400 | 2381 | 164 | 312 | 1.2 |
| 5600 | 1587 | 164 | 312 | 1.3 |
| 4200 | 1190 | 164 | 312 | 1.4 |

After fabricating a TFT-LCD (Thin Film Transistor-Liquid Crystal Device) in which a control electrode voltage coefficient is changed to cause a displaying operation to occur, the pixel was observed by a microscopy and by visual check. FIGS. 31, 32, 33 and 34 are microscopic photos showing the pixel at a time of displaying, which corresponds to each value (1.1, 1.2, 1.3 and 1.4) of the control electrode voltage coefficients shown in Table 1. As shown in FIGS. 31 to 34, using the TFT-LCDs each having the different control electrode voltage coefficient, the orientation control of the multi-domain fluid crystal was able to be achieved based on the principles of the present invention. More exact control of the liquid crystal orientation was able to be achieved when the control electrode voltage coefficient is 1.2 or more, preferably 1.3 or more. In the case of the TFT-LCD having the control electrode voltage coefficient being as small as 1.1, some variations in the appearance of the pixel were found by the visual checking. It is apparent from the above observation result that the larger control electrode voltage coefficient can provide an excellent orientation controllability. However, as the control electrode voltage coefficient becomes larger, the voltage applied to the pixel electrode decreases relatively and, therefore, it is not desirable, from a viewpoint of a driving voltage or brightness of the pixel, that the control electrode voltage coefficient becomes too large. When these points are taken into consideration, the most preferable control electrode voltage coefficient is about 1.3.

Thus, in the seventh embodiment, almost the same effects as in the case of the first embodiment can be obtained as well.

Eighth Embodiment

In an eighth embodiment of the present invention, based on the application example (w) shown in FIG. 23E provided in the sixth embodiment, two or more liquid crystal cells for experimental use each having a different size of a minute orientation area were fabricated for comparison purpose. The "minute orientation area" represents an area partitioned by end portions of the control electrode 73 and pixel electrode 71 and by a boundary such as the aperture section 74 mounted on the pixel electrode 71 or a like, where the liquid crystal takes single orientation in general.

According to this embodiment, in the application example (w) shown in FIG. 23E, one minute orientation area is about 40·m² in size. The liquid crystal cell for the experimental use having the minute orientation area being about 20·m² in size was fabricated. Another liquid crystal cell for the experimental use having the minute orientation area being about 40·m² in size was also fabricated to be used for the comparison. These liquid crystal cells are so configured that the mounting of the TFT, gate bus line and drain bus line or a like is omitted and that the voltage can applied directly to the control electrode 73 and directly to the pixel electrode 72.

Figure 35A:
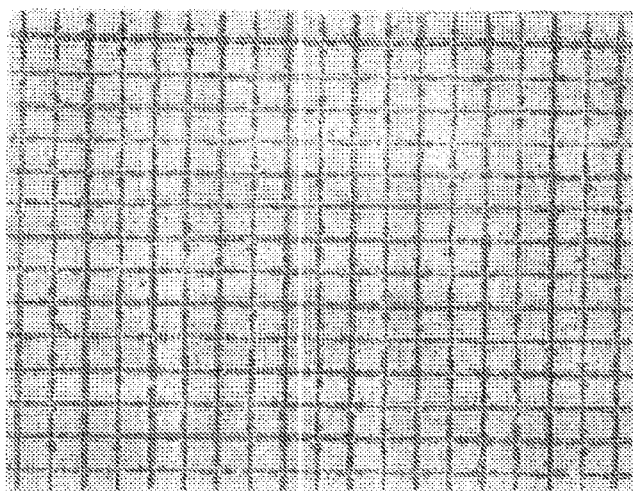
FIGS. 35A and 35B are microscopic photos showing the pixel obtained after switching a voltage to change a dark state to a bright state in a liquid crystal cell fabricated for experimental use in a multi-domain liquid crystal display device according to an eighth embodiment of the present invention.
Figure 35B:
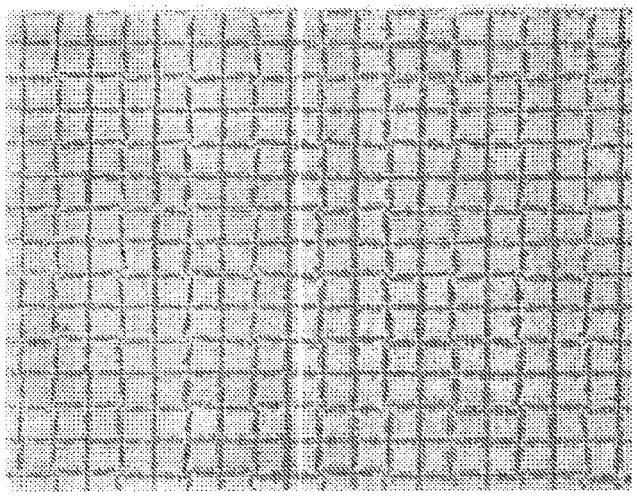

FIGS. 35A and 35B are microscopic photos showing the pixel obtained after switching a voltage to change a dark state to a bright state in a liquid crystal cell for experimental use in the multi-domain liquid crystal display device according to the eighth embodiment of the present invention. FIG. 35A is the photo showing a state obtained after being left for 20 ms following the switching of the voltage to change the dark state to the bright state. FIG. 35B is the photo showing a state obtained after being left for more than 1 second following the switching of the voltage to change the dark state to the bright state. As is apparent from the comparison between the both photos, in the example, the orientation state being almost equal to the orientation in a steady state can be obtained in 20 ms after the application of the voltage and the excellent stability and electrooptic response characteristic in the orientation can be provided. The response time obtained from actual measurement was about 15 ms for the change from the dark state to the bright state and about 9 ms for the change from the bright state to the dark state.

Figure 36A:
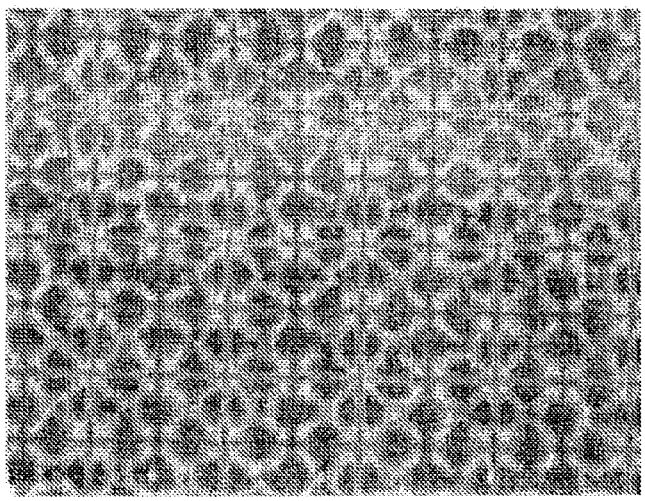
FIGS. 36A and 36B are microscopic photos showing the pixel obtained after switching the voltage to change the dark state to the bright state in the liquid crystal cell fabricated for experimental use in the multi-domain liquid crystal display device according to the eighth embodiment of the present invention.
Figure 36B:
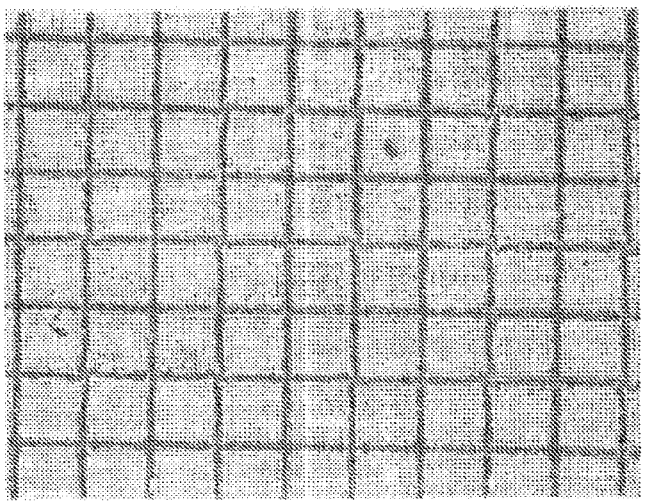

FIGS. 36A and 36B are microscopic photos showing the pixel obtained after switching the voltage to change the dark state to the bright state in the liquid crystal cell fabricated for experimental use in the multi-domain liquid crystal display device according to the eighth embodiment. FIG. 36A is the photo showing the state obtained after being left for 20 ms following the switching of the voltage to change the dark state to the bright state. FIG. 35B is the photo showing the state obtained after being left for more than 1 second following the switching of the voltage to change the dark state to the bright state. As is apparent from the comparison between the both photos, in the example, some time is required before the orientation in the bright steady state is obtained after the application of the voltage. The response time obtained from actual measurement was about 140 ms for the change from the dark state to the bright state and about 9 ms for the change from the bright state to the dark state.

As described above, in the example, the electrooptic response characteristic has been confirmed to be more excellent in the case where the minute orientation area is small (20·m²) in size than in the case where the minute orientation area is large (40·m²) in size. However, the light transmission rate for the whole display device has been also confirmed to be more excellent in the case where the minute orientation area is large in size due to a difference in density in the dark line that can be seen in each of the minute orientation area boundaries. That is, the light transmission rate for the whole liquid crystal cell fabricated for the experimental use has been confirmed to be higher in the case where the minute orientation area is larger in size than in the case where the minute orientation area is smaller in size.

Therefore, the minute orientation area size can be freely selected depending on applications including a displaying of a moving picture or on considerations of tradeoffs between the area size and a pixel pitch of a target TFT-LCD. The size of the minute orientation area is preferably about 20·m² or less in the case where the moving picture is displayed, while it is preferably about 40·m² or more in the case where no moving picture is displayed. Depending on its applications, the size may be set in a range between 20·m² to 40·m².

Thus, in the eighth embodiment, almost the same effects as in the case of the first embodiment can be obtained as well.

Ninth Embodiment

Figure 37:
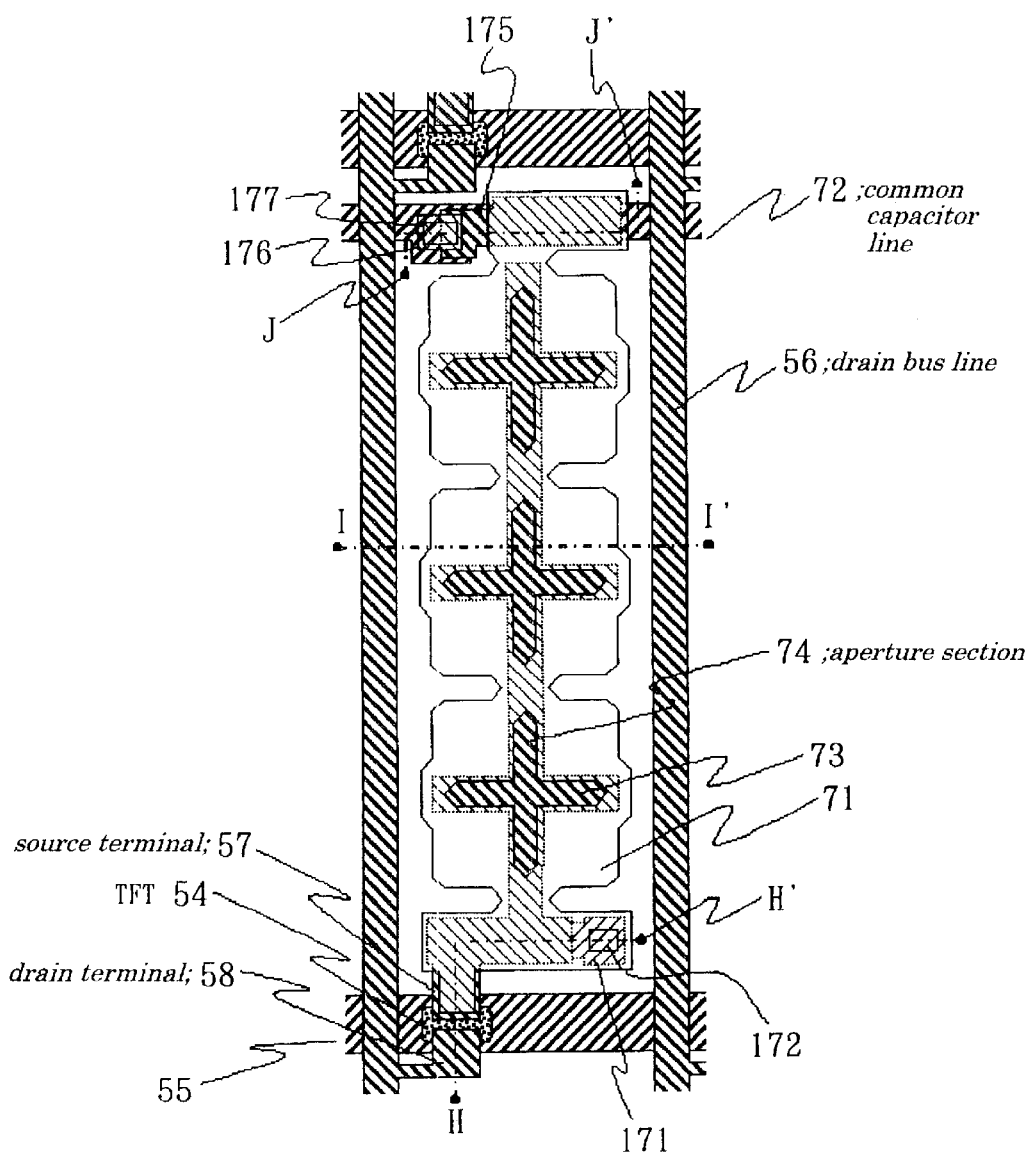
FIG. 37 is a schematic top view of configurations of a pixel employed in a multi-domain liquid crystal display device according to a ninth embodiment of the present invention.
Figure 38:
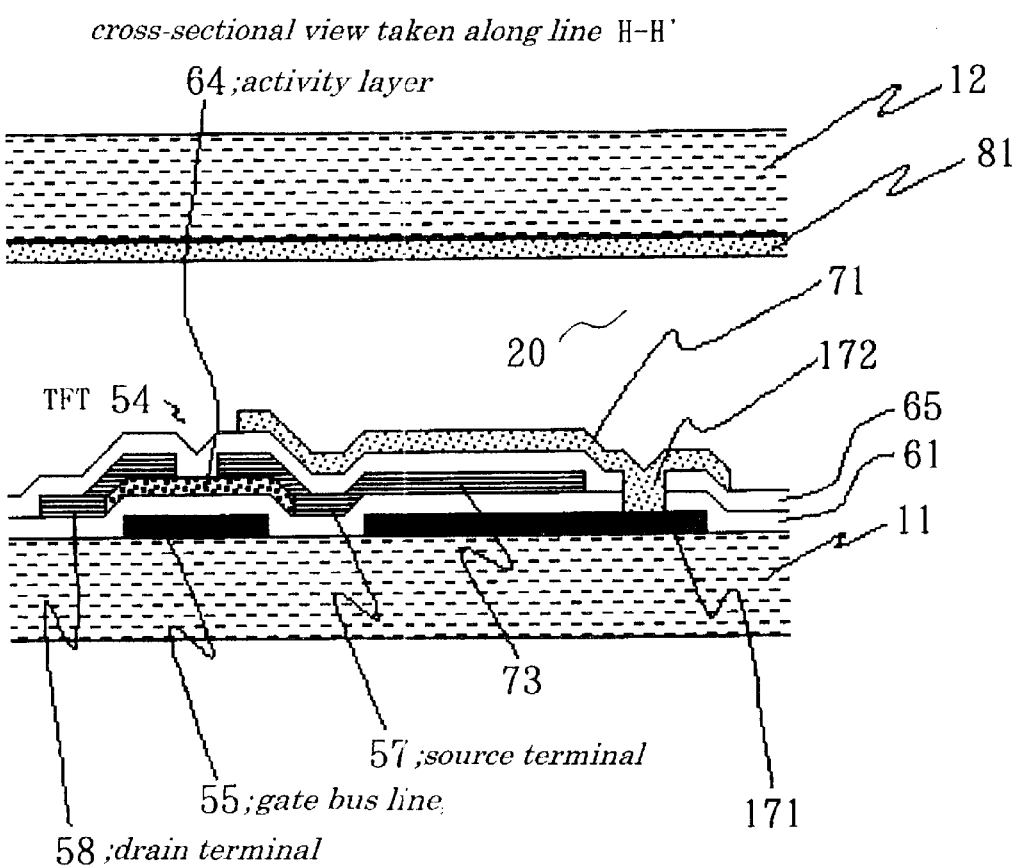
FIG. 38 is a schematic cross-sectional view of the pixel employed in the multi-domain liquid crystal display device of FIG. 37 taken along the line H–H'.
Figure 39:
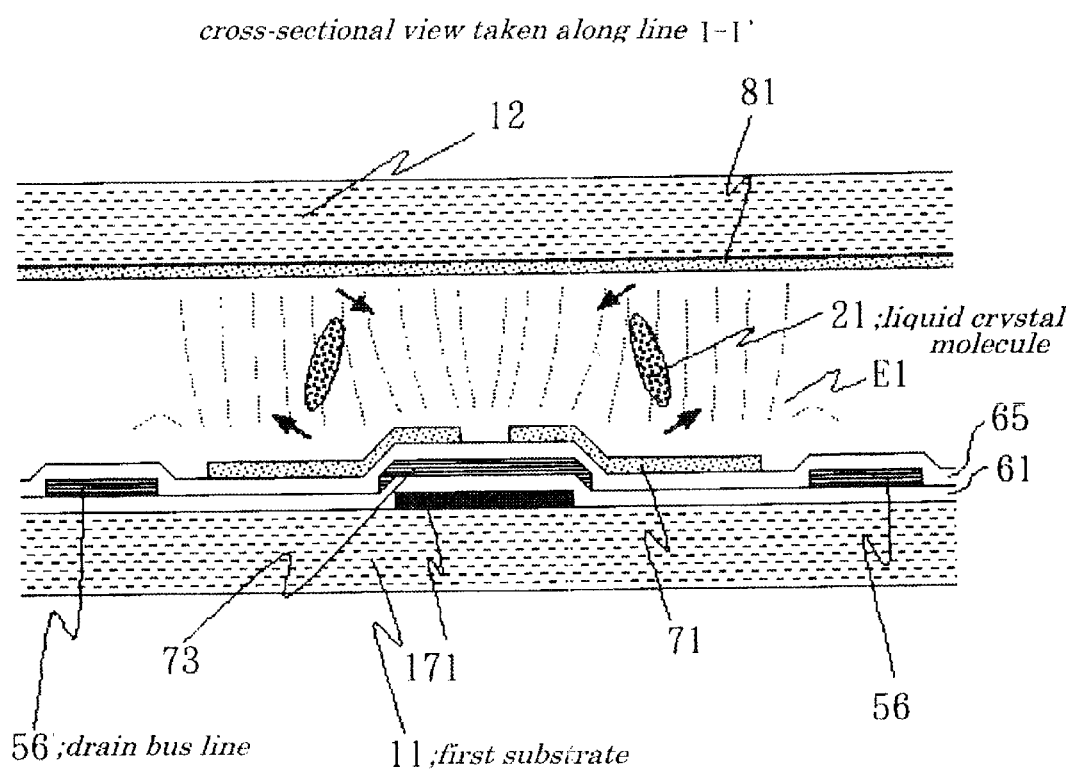
FIG. 39 is a schematic cross-sectional view of the pixel employed in the multi-domain liquid crystal display device of FIG. 37 taken along the line I–I'.
Figure 40:
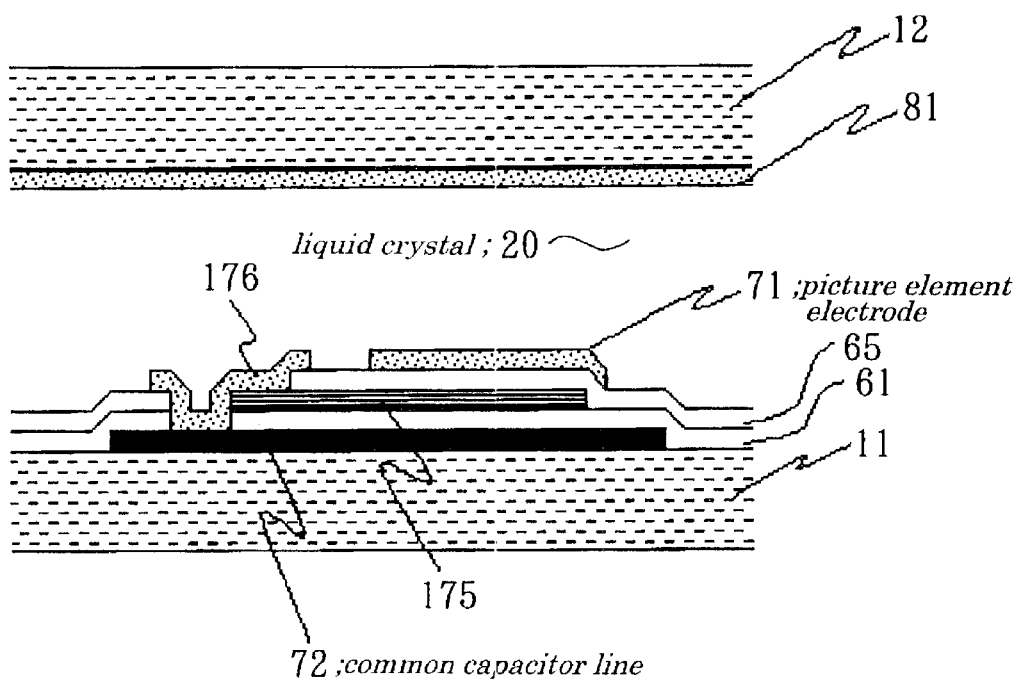
FIG. 40 is a schematic cross-sectional view of the pixel employed in the multi-domain liquid crystal display device of FIG. 37 taken along the line J–J'.

FIG. 37 is a schematic top view of configurations of a pixel employed in a multi-domain liquid crystal display device according to a ninth embodiment of the present invention. FIG. 38 is a schematic cross-sectional view of the pixel employed in the multi-domain liquid crystal display device of FIG. 37 taken along the line H–H'. FIG. 39 is a schematic cross-sectional view of the pixel employed in the multi-domain liquid crystal display device of FIG. 37 taken along the line I–I'. Configurations of the multi-domain liquid crystal display device of the ninth embodiment differ greatly from those in the first embodiment in that the control electrode is formed integrally with the source terminal of the TFT serving as a switching device. That is, in the multi-domain liquid crystal display device of the embodiment, as shown in FIGS. 37 to 39, the control electrode 73 is formed integrally with the source terminal 57 of the TFT 54, both of which are composed of opaque metal made of chromium. To eliminate a risk of a decrease in the aperture rate that may occur in the configuration as above when a capacitance value of the coupling capacitor 126 is made large, special consideration is given in order to secure the sufficiently large aperture rate. That is, the coupling capacitor electrode 171 is formed under the control electrode 73 with the gate insulating film 61 interposed between them and the pixel electrode 71 is formed above the control electrode 73 with the semiconductor film 62 interposed between them. The coupling capacitor electrode 171 has a portion where the coupling capacitor electrode 171 is overlain by the control electrode 73 and the pixel electrode 71 has also a portion where the pixel electrode 71 and the pixel electrode 71 is overlain by the control electrode 73 and the pixel electrode 71 is connected to the coupling capacitor electrode 171 through a contact hole 172. In FIG. 37, since most parts of the coupling capacitor electrode 171 are hidden under the control electrode 73, though detailed configuration state is not clear, as is clear from FIG. 39, the coupling capacitor electrode 171 is disposed under the control electrode 73 approximately along the shape of the control electrode 73.

According to this embodiment, since the coupling capacitor 126 can be formed on both sides under and above the control electrode 73, even if the capacitance of the coupling capacitor 126 is made large, it is not necessary to make the area of the control electrode 73 so large, and therefore the sufficient aperture rate can be obtained.

In the embodiment, the control electrode 73 is formed under the pixel electrode 71. However, the pixel electrode 71 may be formed under the control electrode. By connecting the coupling capacitor electrode 171 disposed under the pixel electrode 71 with the control electrode 73 through the contact hole 172, the coupling capacitance may be generated on both sides under and above the pixel electrode 71.

Moreover, according to this embodiment, the additional capacitor 127 is so constructed that a sufficient capacitance can be obtained even if the overlying area is small. That is, the additional capacitor 127 is formed, using the contact hole 177, by an additional capacitor terminal 175 connected to the common capacitor line 72 by a connecting terminal 176 and by overlying section with the pixel electrode 71. The common capacitor line 72 is disposed on the same layer as the gate bus line 55, both of which are composed of metal films and the additional capacitor terminal 175 is disposed on the same layer as the drain bus line 56, both of which are composed of metal films as well. Thus, since the additional capacitor terminal 175 is formed in a layer being near the pixel electrode 71, the sufficient capacitance of the additional capacitor 127 can be obtained even if the overlying area is small.

In the embodiment, the additional capacitor 127 is formed in the manner that the semiconductor film 62 is interposed, however, even in the case where the additional capacitor 127 is formed in a manner that the gate insulating film 61 is interposed, a large capacitance can be obtained and more efficiently than in the case where the additional capacitor 127 is formed in a manner that two insulating films including the gate insulating film 61 and the semiconductor film 62. Furthermore, the sufficient capacitance value and increased aperture rate in such small overlying areas can be obtained not only by putting some thought in improving the layer structure but also by making thin the thickness of the gate insulating film 61 or the semiconductor film 62 or by increasing the dielectric constant.

Also, in the embodiment, patterning accuracy in the control electrode 73 can be improved by configuring the control electrode 73 using metal films. This is because wet etching with high accuracy can be performed if opaque metal such as Cr (chromium) or a like is used instead of transparent metal such as ITO or a like. In the multi-domain liquid crystal display device of the present invention, since the capacitance value of each capacitor formed on the overlying portion of electrodes is an important parameter, it is important to improve the patterning accuracy in fabricating the electrodes which actually define the size of the overlying area.

Figure 41A:
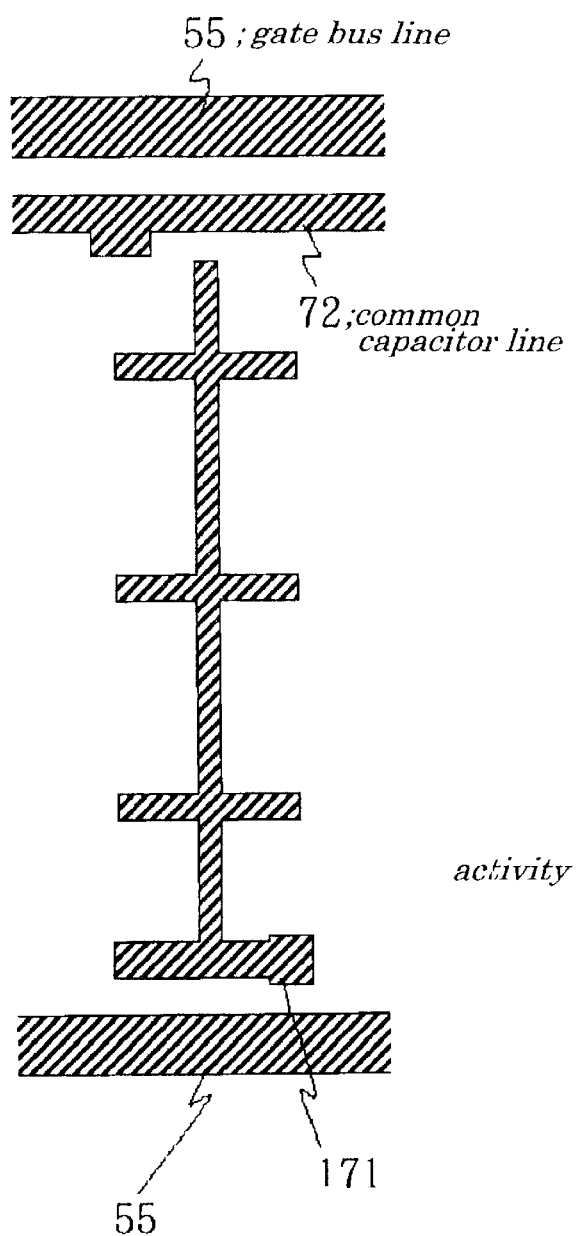
FIGS. 41A and 41B are process diagrams showing a method of producing the multi-domain liquid crystal display device of FIG. 37.
Figure 41B:
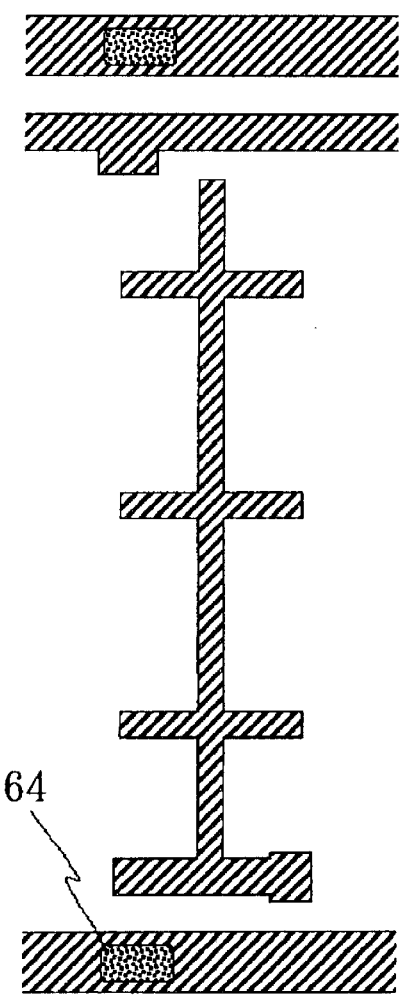

A method of producing the multi-domain liquid crystal display device of the ninth embodiment will be described in order of processes by referring to FIGS. 41A through 43. As shown in FIG. 41A, after a chromium film is formed by sputtering on a substrate 11 made of glass, patterning is performed by wet etching on the chromium film in accordance with photolithography technology to form a gate bus line 55, a common capacitor line 72 and a coupling capacitor electrode 171. Next, as shown in FIG. 41B, a silicon nitride film is formed by the CVD method to uniformly form a gate insulating film 61. The gate insulating film 61 may be composed of silicon dioxide or of a stacked films made of silicon nitride and silicon oxide. It may be also composed of organic films. Then, amorphous silicon layer is formed by the CVD method and patterning is performed by dry etching on the layer in accordance with the photolithography technology to form an activity layer 64 of the TFT 54 in an aligned form.

Figure 42A:
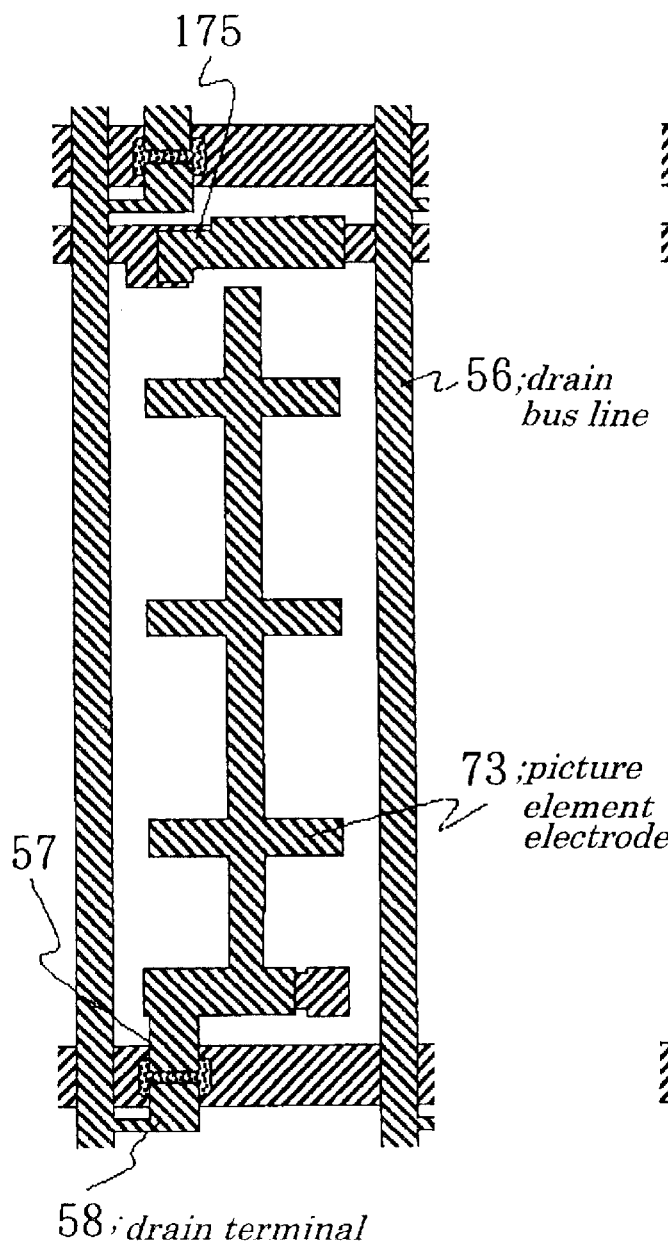
FIGS. 42A and 42B are process diagrams showing the method of producing the multi-domain liquid crystal display device of FIG. 37.
Figure 42B:
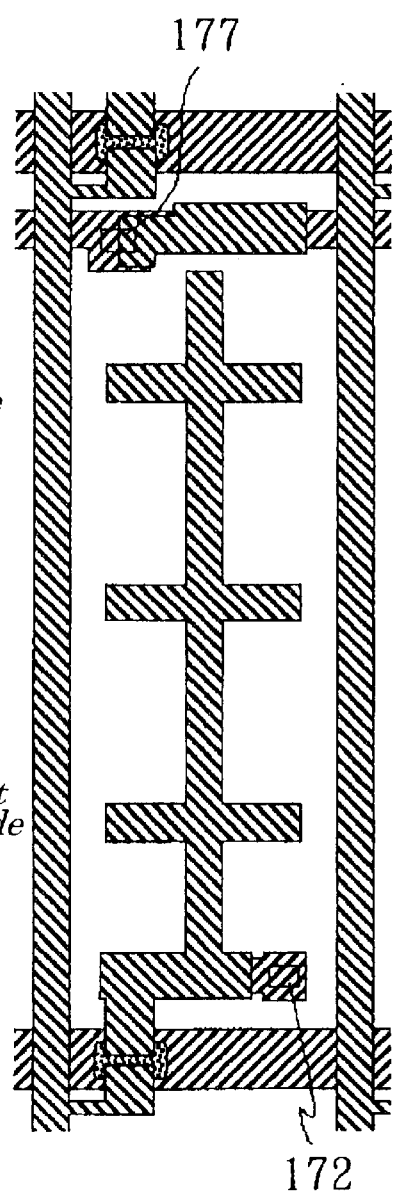
Figure 43:
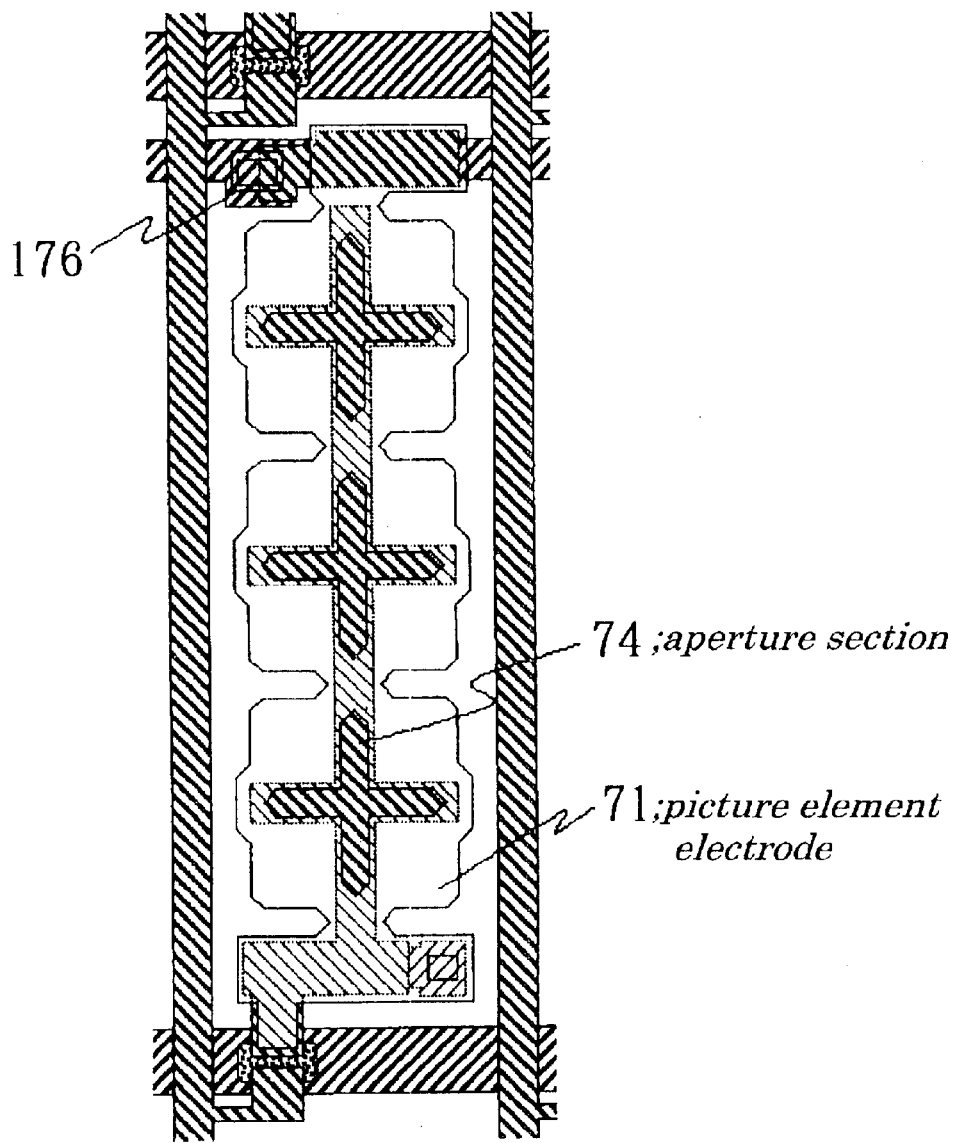
FIG. 43 are process diagrams showing the method of producing the multi-domain liquid crystal display device of FIG. 37.

Next, as shown in FIG. 42A, after a chromium film is formed by sputtering, patterning is performed by wet etching on the chromium film in accordance with the photolithography technology to form a drain bus line 56, a drain terminal 58, a source terminal 57, a control electrode 73 and additional capacitor terminal 175. Then, as shown in FIG. 42B, the semiconductor film 62 is integrally formed with silicon nitride by the CVD method and patterning is performed by dry etching on the semiconductor film 62 and the gate insulating film 61 to form contact holes 172 and 177. Subsequently, as shown in FIG. 43, the ITO film is formed by sputtering and patterning is performed on the ITO film by dry etching in accordance with the photolithography technology to form the pixel electrode 71 being electrically in a floating state and a connecting terminal 176. Moreover, in the processes of forming the pixel electrode 71 and the connecting terminal 176, by performing on the ITO film by dry etching instead of wet etching, the patterning accuracy can be improved.

As described above, the first substrate 11 is formed by 5 processes in which the photolithography technology is used a total of five times. Though not explained here in details, all necessary peripheral devices including a gate bus line terminal, drain bus line terminal, common capacitor line connecting section, electrostatic protective transistors or a like, which are mounted in portions surrounding the display area in the multi-domain liquid crystal display device of the present invention can be also fabricated at the same time with those components described above without addition of particular processes. Detailed description of these peripheral devices are disclosed in Japanese Patent Application Laid-open No. Hei10-232409. Other processes including manufacturing of the second substrate 12 and lamination of the first substrate 11 and second substrate 12 can be executed in conformance with the manufacturing method of the first embodiment.

Thus, in the ninth embodiment, almost the same effects as in the case of the first embodiment can be obtained as well.

Tenth Embodiment

Figure 44:
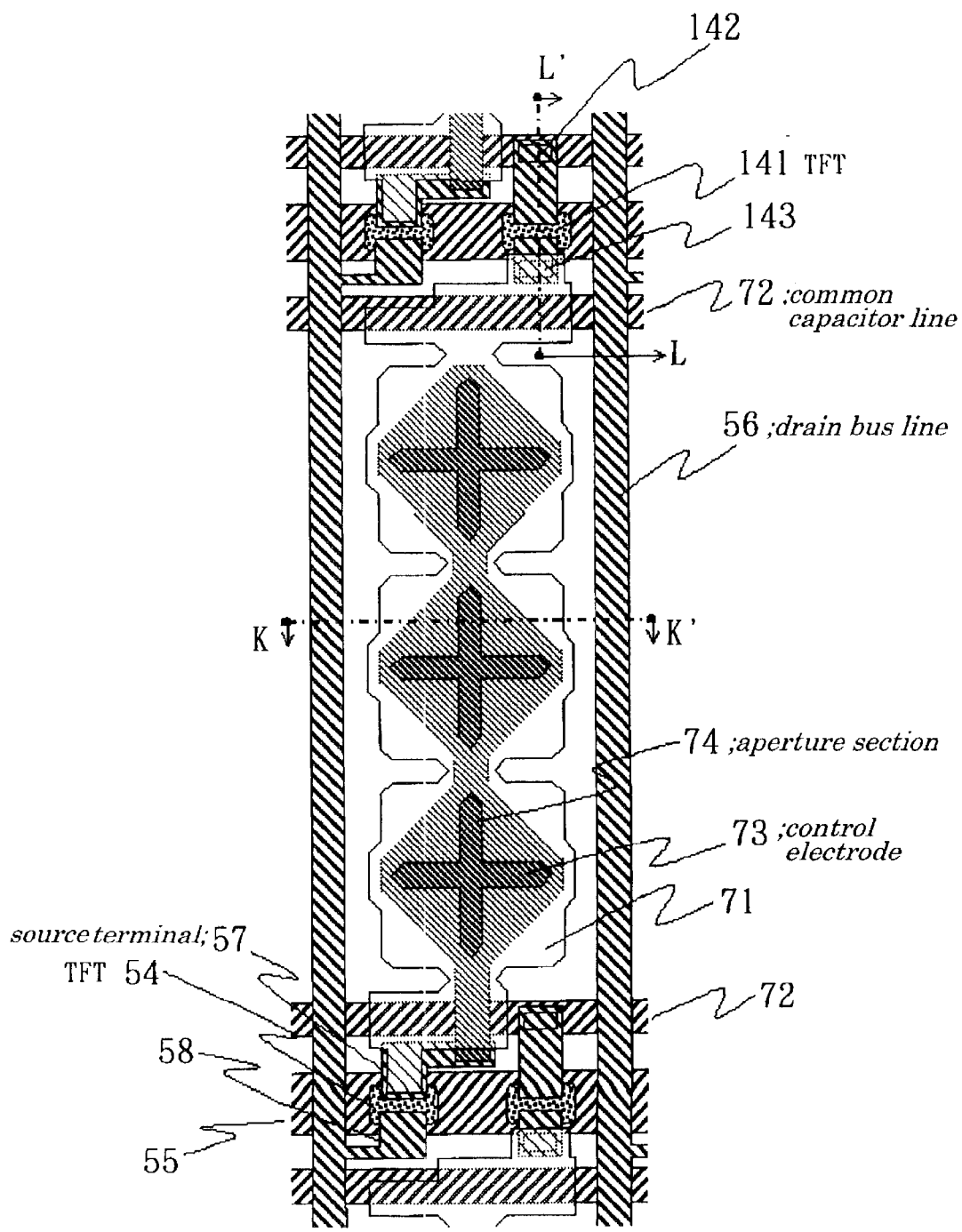
FIG. 44 is a schematic top view of configurations of a pixel employed in a multi-domain liquid crystal display device according to a tenth embodiment of the present invention.
Figure 45:
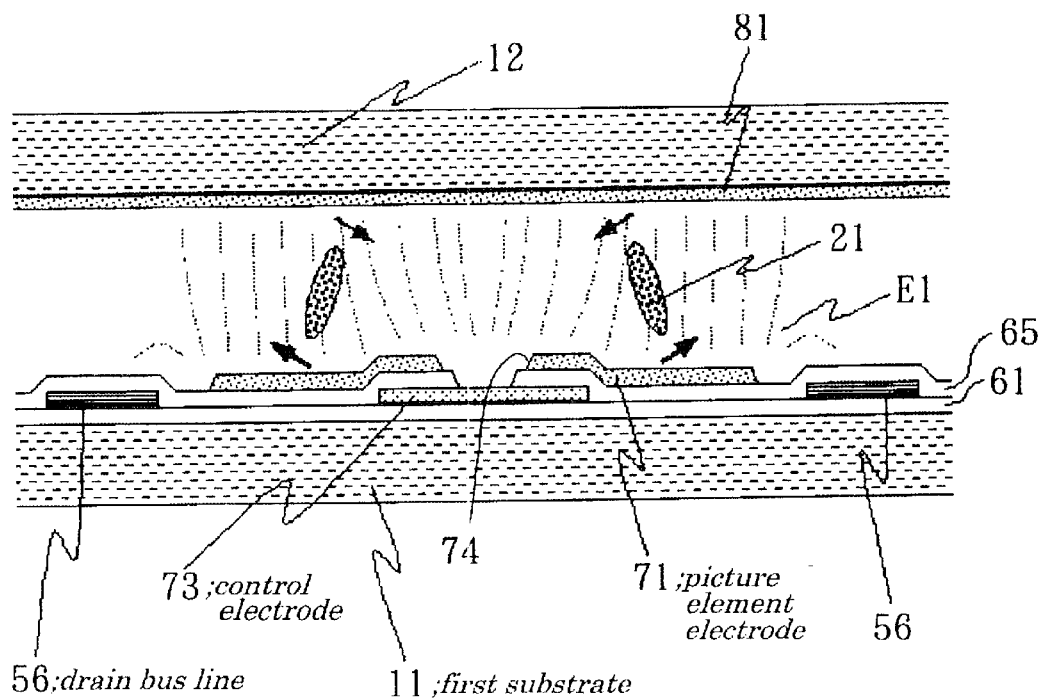
FIG. 45 is a schematic cross-sectional view of the pixel employed in the multi-domain liquid crystal display device of FIG. 44 taken along the line K–K'.
Figure 46:
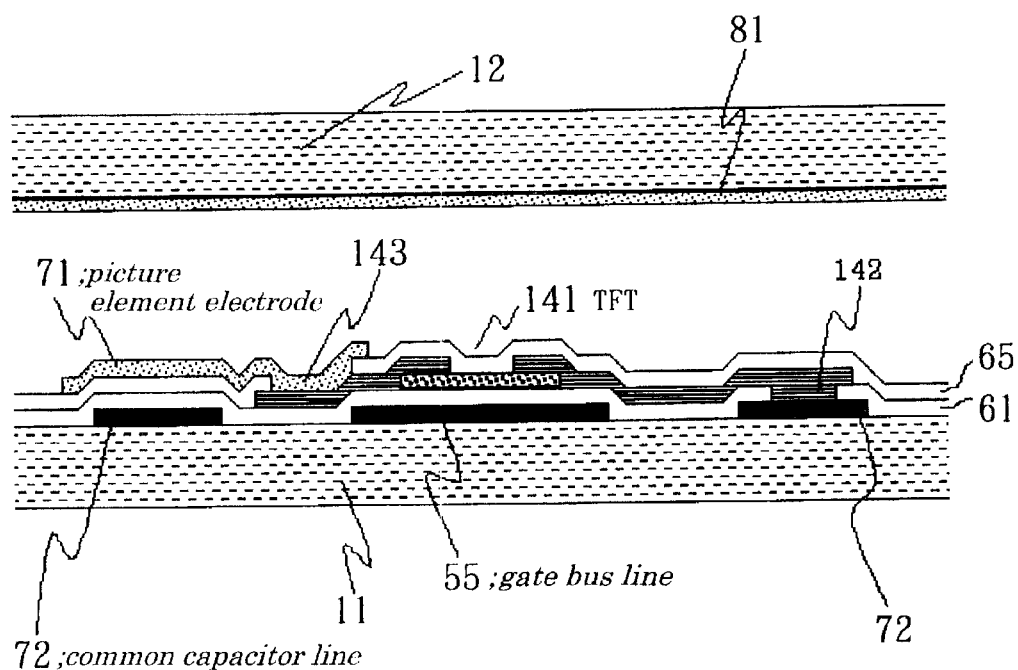
FIG. 46 is a schematic cross-sectional view of the pixel employed in the multi-domain liquid crystal display device of FIG. 44 taken along the line L'L'.
Figure 47:
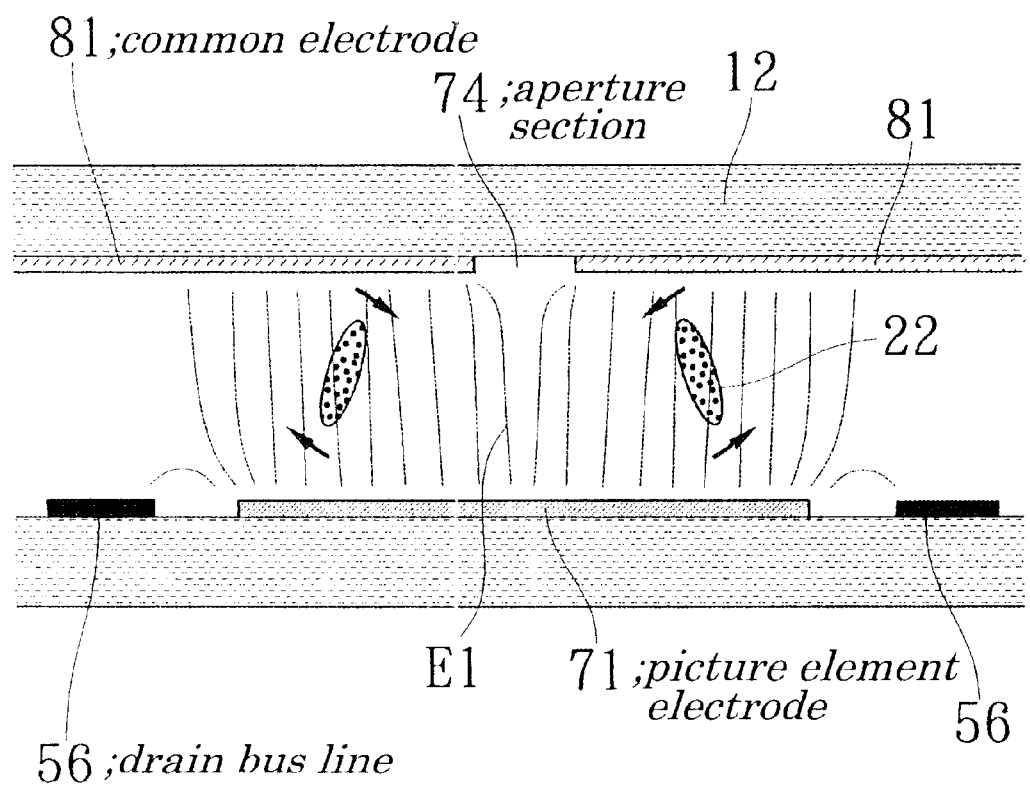
FIG. 47 is a schematic partial cross-sectional view showing a pixel of a conventional multi-domain liquid crystal device.

FIG. 44 is a schematic top view of configurations of a pixel employed in a multi-domain liquid crystal display device according to a tenth embodiment of the present invention. FIG. 45 is a schematic cross-sectional view of the pixel employed in the multi-domain liquid crystal display device of FIG. 44 taken along the line K–K'. FIG. 46 is a schematic cross-sectional view of the pixel employed in the multi-domain liquid crystal display device of FIG. 44 taken along the line L–L'. Configurations of the multi-domain liquid crystal display device differ greatly from those in the first embodiment in that a TFT for discharging is mounted on the gate bus line corresponding to a front stage of a pixel to be selected. That is, the multi-domain liquid crystal display device of this embodiment has configurations in which the TFT used to discharge accumulated electric charges is mounted on the gate bus line 55 corresponding to the front stage of the pixel to be selected in the modified example described as the third embodiment by referring to FIG. 3. A gate terminal, drain terminal, source terminal, activity layer or a like constituting the TFT 141 can be formed at the same time with the TFT 54 for displaying. The drain terminal of the TFT 141 is connected to a common capacitor line 72 through a contact hole 142 and its source terminal is connected to the pixel electrode 71 through a contact hole 143. In the configuration as above, the electric charge accumulated in the pixel electrode 71 can be discharged by writing a potential of the common capacitor line 72 into the pixel electrode 71 the instant the gate bus line 55 at the front stage is selected.

Moreover, according to this embodiment, at the area corresponding to an aperture section 74 on which a control electric field generated by the control electrode 73 disposed in the lower layer, out of aperture sections 74 formed on the pixel electrode 71, the semiconductor film 62 is removed. By configuring as above, a loss in voltages at an insulating portion between the control electrode 73 and the liquid crystal layer disappears, thus causing the electric field from the control electrode 73 to be applied directly to the liquid crystal layer. Furthermore, an effect can be obtained that, since a concave-shaped portion formed by removal of the semiconductor film 62 enables matching to skew directions of the liquid crystal molecule caused by skew electric field, orientations of the liquid crystal at a boundary of fine orientation areas become stable. The process of removing the semiconductor film 62 can be executed at the same time with processes of exposing terminal portions surrounding the display area and therefore additional process is not required.

Thus, in the tenth embodiment, almost the same effects as in the case of the first embodiment can be obtained as well.

As described above, according to the present invention, since the control electrode is driven by the switching device, even if the pixel operates to display the bright state, bright state or gray shade, the pixel is controlled by the control electrode potential depending on each of displayed states and therefore the domain formation of the liquid crystal can be reliably controlled by the skew electric field generated from the control electrode in a spreading manner. Moreover, since a partial pressure of the control electrode voltage is applied through the coupling capacitor to the picture electrode, both the control electrode and pixel electrode can be controlled by only one switching device.

It is, therefore, possible to provide the multi-domain liquid crystal display device having the sharp contrast and excellent viewing angle characteristics without increased complicated processes such as microfabrication processes for the common electrode or without the necessity for highly sophisticated laminating technology.

It is apparent that the present invention is not limited to the above embodiments but may be changed and modified without departing from the scope and spirit of the invention. For example, in the above embodiments, the TFT is used as the switching device, however, a diode such as an MIM (Metal Insulator Metal) or a like may be used as well. Moreover, in the above embodiments, the ITO is used as the material for the transparent electrode constituting the pixel electrode and the control electrode, however, other materials such as a NESA coat (tin oxide film) or a like may be used. If the control electrode is constructed of the transparent electrode, it may be used partially for the transparent electrode. Moreover, in the above embodiments, chromium is used as the metal material for the gate bus line, source terminal, drain terminal or a like, however, molybdenum, tantalum or other materials such as their alloys may be used.

What is claimed is:

1. A multi-domain liquid crystal display device comprising:
  a liquid crystal held and put between a pair of substrates;
  two or more gate bus lines formed on one of said substrates and extending horizontally;
  two or more drain bus lines extending vertically;
  a plurality of pixels each being formed corresponding to each point of intersection of said gate bus lines and said drain bus lines and being formed in a matrix form; and
  whereby said each pixel is provided with a switching device to select a desired pixel, with a pixel electrode and with a control electrode operating to form two or more orientation areas within one pixel by generating a skew electric field acting on said liquid crystal and wherein said control electrode is connected to one of terminals of said switching device and a coupling capacitor is connected between said pixel electrode and said control electrode and wherein a signal voltage is applied from corresponding said drain bus line through corresponding said switching device at a time of selecting said corresponding gate line and a partial voltage of said signal voltage is applied to said pixel electrode through said coupling capacitor.

2. The multi-domain liquid crystal display device according to claim 1, wherein said pixel electrode is formed under said control electrode and an interlayer dielectric is formed between said pixel electrode and said control electrode.

3. The multi-domain liquid crystal display device according to claim 1, wherein an aperture section is formed on said pixel electrode.

4. The multi-domain liquid crystal display device according to claim 3, wherein said aperture section is formed in a window-like shape.

5. The multi-domain liquid crystal display device according to claim 3, wherein said aperture section is formed in a manner that incisions are exercised from one side or both sides of said pixel electrode.

6. The multi-domain liquid crystal display device according to claim 3, wherein said control electrode controls an electric field acting on an orientation state of said liquid crystal through said aperture section.

7. The multi-domain liquid crystal display device according to claim 1, further comprising a common capacitor line to add capacitance to said pixel electrode.

8. The multi-domain liquid crystal display device according to claim 7, wherein said common capacitor line is disposed at said aperture section.

9. The multi-domain liquid crystal display device according to claim 7, further comprising a coupling capacitor having predetermined capacitance connected between said pixel electrode and said common capacitor line.

10. The multi-domain liquid crystal display device according to claim 9, wherein at least a part of said coupling capacitor is constructed by having an additional capacitor terminal electrically connected to either of said pixel electrode or said common capacitor line overlain by other electrode to which said additional capacitor terminal is not connected, with an insulating film interposed between them.

11. The multi-domain liquid crystal display device according to claim 9, wherein at least a part of said coupling capacitor is constructed by having an additional capacitor terminal electrically connected to either of said pixel electrode or said common capacitor line overlain by other electrode to which said additional capacitor terminal is not connected, with a gate insulating film interposed between them.

12. The multi-domain liquid crystal display device according to claim 7, further comprising a resistor device having a substantially finite resistance valued is posed between said pixel electrode and said common capacitor line.

13. The multi-domain liquid crystal display device according to claim 1, wherein a part of said control electrode is composed of a transparent electrode.

14. The multi-domain liquid crystal display device according to claim 13, wherein said control electrode has quarter-wave plates at each side of a liquid crystal layer, which is disposed in a manner that optic axes of said quarter-wave plates are intersected at right angles.

15. The multi-domain liquid crystal display device according to claim 1, wherein quarter-wave plates are provided on both sides of said liquid crystal and said quarter-wave plates are placed in a manner that their optic axes are intersected at right angles.

16. The multi-domain liquid crystal display device according to claim 1, wherein said switching device is a TFT (Thin Film Transistor) having a bottom gate structure.

17. The multi-domain liquid crystal display device according to claim 16, wherein said interlayer dielectric is formed integrally with a passivation film of said TFT.

18. The multi-domain liquid crystal display device according to claim 16, wherein said control electrode is formed integrally with a source terminal of said TFT.

19. The multi-domain liquid crystal display device according to claim 16, wherein at least a part of said coupling capacitor is constructed by having a coupling capacitor terminal electrically connected to either of said pixel electrode or said control electrode overlain by other electrode to which said coupling capacitor terminal is not connected, with a gate insulating film interposed between them.

20. The multi-domain liquid crystal display device according to claim 1, wherein said switching device is a TFT having a top gate structure.

21. The multi-domain liquid crystal display device according to claim 20, wherein said interlayer dielectric is formed integrally with a passivation film of said TFT.

22. The multi-domain liquid crystal display device according to claim 20, wherein said interlayer dielectric is formed integrally with a passivation film of said TFT.

23. The multi-domain liquid crystal display device according to claim 1, further comprising a resistor device to discharge electric charges accumulated in said pixel electrode between said pixel electrode and said control electrode.

24. The multi-domain liquid crystal display device according to claim 23, wherein said resistor device has a substantially finite resistance value.

25. The multi-domain liquid crystal display device according to claim 1, wherein an operation mode of said liquid crystal is a TN (Twisted Nematic) mode in which said liquid crystal having positive dielectric constant anisotropy is orientated in a twisted manner.

26. The multi-domain liquid crystal display device according to claim 25, wherein said liquid crystal is spontaneously chiral.

27. The multi-domain liquid crystal display device according to claim 25, wherein said liquid crystal is unspontaneously chiral.

28. The multi-domain liquid crystal display device according to claim 1, wherein said operation mode of said liquid crystal is a homogeneous mode in which said liquid crystal having positive dielectric constant anisotropy is orientated in a uniform manner.

29. The multi-domain liquid crystal display device according to claim 1, wherein said operation mode of said liquid crystal is a VA (Vertical Alignment) mode in which said liquid crystal having negative dielectric constant anisotropy is orientated in a homeotropic direction.

30. The multi-domain liquid crystal display device according to claim 1, wherein said pixel electrode is constructed of two or more fine pixel electrodes each having a shape of a square and said control electrode is disposed along one side of said square and remaining three sides constitute a part of said aperture section or end portion of said pixel electrode.

31. The multi-domain liquid crystal display device according to claim 30, wherein said square is almost regular square.

32. The multi-domain liquid crystal display device according to claim 31, wherein a ratio of said control electrode voltage applied to said control electrode, relative to a voltage of said common electrode, to a pixel electrode voltage applied to said pixel electrode, relative to a voltage of said common electrode, is set to 1.1 to 1.4.

33. The multi-domain liquid crystal display device according to claim 32, wherein a ratio of said control electrode voltage to said pixel electrode voltage is set to 1.2 to 1.4.

34. The multi-domain liquid crystal display device according to claim 33, wherein a ratio of said control electrode voltage to said pixel electrode voltage is set to about 1.3.

35. The multi-domain liquid crystal display device according to claim 31, wherein said minute orientation area in which said liquid crystal is orientated in a uniform manner is about $20 \cdot m^2$ or less in size.

36. The multi-domain liquid crystal display device according to claim 31, wherein said minute orientation area in which said liquid crystal is orientated in a uniform manner is about $40 \cdot m^2$ or less in size.

37. The multi-domain liquid crystal display device according to claim 31, wherein said minute orientation area in which said liquid crystal is orientated in a uniform manner is $20 \cdot m^2$ to $40 \cdot m^2$ in size.

38. The multi-domain liquid crystal display device according to claim 1, wherein said pixel electrode is constructed of two or more fine pixel electrodes each being a square in shape and said control electrode is disposed along two sides of said square and remaining two sides constitute a part of said aperture section or end portion of said pixel electrode.

39. The multi-domain liquid crystal display device according to claim 38, wherein said square is almost regular square.

40. A The multi-domain liquid crystal display device according to claim 39, wherein a ratio of said control electrode voltage applied to said control electrode, relative to a voltage of said common electrode, to a pixel electrode voltage applied to said pixel electrode, relative to a voltage of said common electrode, is set to 1.1 to 1.4.

41. The multi-domain liquid crystal display device according to claim 40, wherein a ratio of said control electrode voltage to said pixel electrode voltage is set to 1.2 to 1.4.

42. The multi-domain liquid crystal display device according to claim 1 , wherein said pixel electrode is constructed of two or more fine pixel electrodes each being a triangle in shape and said control electrode is disposed along two sides of said triangle and remaining one side constitutes a part of said aperture section or said pixel electrode end portion.

43. The multi-domain liquid crystal display device according to claim 1, wherein said pixel electrode is constructed of two or more fine pixel electrodes each being a triangle in shape and said control electrode is disposed along one side of said triangle and remaining two sides constitute a part of said aperture section or said pixel electrode end portion.

44. The multi-domain liquid crystal display device according to claim 1, wherein said pixel electrode is constructed of two or more fine pixel electrodes each being a pentagon in shape and said control electrode is disposed along two sides of said pentagon and remaining three sides constitute a part of said aperture section or said pixel electrode end portion.

45. The multi-domain liquid crystal display device according to claim 1, wherein said pixel electrode is constructed of a plurality of fine pixel electrodes and said fine pixel electrodes are constructed by a combination of more than two kinds of said fine pixel electrodes stated in claim 30.

46. The multi-domain liquid crystal display device according to claim 1, wherein said pixel electrode is constructed of a plurality of fine pixel electrodes and said fine pixel electrodes are constructed by a combination of more than two kinds of said fine pixel electrodes stated in claim 38.

47. The multi-domain liquid crystal display device according to claim 1, further comprising a discharging device to discharge an electric charge accumulated at said pixel electrode mounted on said gate bus line corresponding to a front stage of an arbitrary pixel.

48. The multi-domain liquid crystal display device according to claim 47, wherein said insulating film is removed from the area corresponding to said aperture section, out of aperture sections formed on said pixel electrode, on which a control electric field generated by said control electrode disposed in the lower layer acts.

49. A multi-domain liquid crystal display device comprising:
- a liquid crystal put between a pair of substrates;
- a plurality of pixels disposed in a matrix form on one of said substrates;
- a switching device mounted in each of said pixels;
- a pixel electrode mounted in each of said pixels;
- a control electrode mounted in each of said pixels and operated to generate skew electric fields acting on said liquid crystal to form two or more orientation areas in one pixel; and whereby said control electrode is connected to one terminal of said switching device and wherein a coupling capacitor is connected between said pixel electrode and said control electrode and wherein a signal voltage is applied through said corresponding switching device to said control electrode and a partial voltage of said signal voltage is applied through said coupling capacitor to said pixel electrode.

* * * * *